(12) United States Patent
Forthuber

(10) Patent No.: US 11,515,762 B2
(45) Date of Patent: Nov. 29, 2022

(54) TRANSPORT UNIT FOR A LONG STATOR LINEAR MOTOR

(71) Applicant: B&R INDUSTRIAL AUTOMATION GMBH, Eggelsberg (AT)

(72) Inventor: Friedrich Forthuber, Handenberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 157 days.

(21) Appl. No.: 16/964,506

(22) PCT Filed: Jan. 18, 2019

(86) PCT No.: PCT/EP2019/051247
§ 371 (c)(1),
(2) Date: Jul. 23, 2020

(87) PCT Pub. No.: WO2019/145227
PCT Pub. Date: Aug. 1, 2019

(65) Prior Publication Data
US 2021/0036583 A1 Feb. 4, 2021

(30) Foreign Application Priority Data
Jan. 24, 2018 (EP) .................................... 18153240

(51) Int. Cl.
*H02K 41/03* (2006.01)
*B65G 23/23* (2006.01)
(Continued)

(52) U.S. Cl.
CPC .......... *H02K 11/215* (2016.01); *B65G 23/08* (2013.01); *B65G 23/19* (2013.01); *B65G 23/23* (2013.01);
(Continued)

(58) Field of Classification Search
CPC .... H02K 41/031; H02K 41/02; H02K 11/215; B65G 23/08; B65G 23/23; H02P 25/064; H02P 6/006; H02P 6/16
(Continued)

(56) References Cited

U.S. PATENT DOCUMENTS 9,428,347 B2 8/2016 Kleinikkink et al.
2003/0230941 A1* 12/2003 Jacobs ................. B65G 47/841
310/12.19

(Continued)

FOREIGN PATENT DOCUMENTS

DE 10 2015 226139 6/2017
EP 3 044 373 3/2015
(Continued)

OTHER PUBLICATIONS

Int'l Search Report (Form PCT/ISA/210) conducted in Int'l Appln. No. 18153240.9 (dated Feb. 27, 2019).
(Continued)

*Primary Examiner* — Michael Andrews
(74) *Attorney, Agent, or Firm* — Greenblum & Berstein, P.L.C.

(57) ABSTRACT

In order to provide a transport unit for a long stator linear motor, wherein the orientation thereof can be easily determined on the long stator linear motor during operational use, according to the invention, the transport unit (1) has a first guide side (FS1) on which a first guide group (G1) is arranged and a second guide side (FS2) on which a second guide group (G2) is arranged. A first magnetic side (S1) positioned laterally relative to the longitudinal direction (x) is opposite a second magnetic side (S2), wherein the first magnetic side (S1) has a magnetic variable with a first value (w1) at a first test distance (a1) from the center of the first longitudinal extension (l1) in the direction of the first end
(Continued)

(I1e), and on the first magnetic side (S1), a magnetic variable with a second value (w2), corresponding to the first value (w1), at the first test distance (a1) from the center of the first longitudinal extension (I1) in the direction of the first start (I1a). On the second magnetic side (S2), the transport unit (1) has a magnetic variable with a third value (w3) at a second test distance (a2) from the center of the second longitudinal extension (I2) in the direction of the second end (I2e), and a magnetic variable with a fourth value (w4), corresponding to the third value (w3), at the second test distance (a2) from the center of the second longitudinal extension (I2) in the direction of the second start (I2a), wherein the first and second values (w1, w2) differ from the third and fourth values (w3, w4).

16 Claims, 8 Drawing Sheets

(51) Int. Cl.
```
H02K 11/215      (2016.01)
H02P 25/064      (2016.01)
H02P 6/00        (2016.01)
H02P 6/16        (2016.01)
B65G 23/08       (2006.01)
B65G 23/19       (2006.01)
H02K 41/02       (2006.01)
```
(52) U.S. Cl.
CPC ........... *H02K 41/02* (2013.01); *H02K 41/031* (2013.01); *H02P 6/006* (2013.01); *H02P 6/16* (2013.01); *H02P 25/064* (2016.02)

(58) Field of Classification Search
USPC ...................................................... 310/12.11
See application file for complete search history.

(56) References Cited

U.S. PATENT DOCUMENTS

| | | | |
|---|---|---|---|
| 2015/0048693 A1* | 2/2015 | Prussmeier | B65G 54/02 |
| | | | 310/12.09 |
| 2015/0231989 A1 | 8/2015 | Lee et al. | |
| 2016/0038840 A1 | 2/2016 | Vance | |
| 2016/0380562 A1* | 12/2016 | Weber | H02P 25/064 |
| | | | 310/12.11 |
| 2017/0183022 A1 | 6/2017 | Vance | |
| 2019/0002204 A1* | 1/2019 | Reinthaler | B65G 23/23 |
| 2019/0100389 A1* | 4/2019 | Neubauer | B65G 54/02 |
| 2019/0389675 A1* | 12/2019 | Kleinikkink | H02K 41/031 |

FOREIGN PATENT DOCUMENTS

| | | |
|---|---|---|
| EP | 2 905 883 | 8/2015 |
| WO | 2010/085670 | 7/2010 |
| WO | 2012/101004 | 8/2012 |
| WO | 2014/047104 | 3/2014 |
| WO | 2015/036302 | 3/2015 |
| WO | 2015/042409 | 3/2015 |
| WO | 2016/022269 | 2/2016 |

OTHER PUBLICATIONS

Int'l Prel. Exam. Report (Forms PCT/IPEA/416 & 409) conducted in Int'l Appln. No. PCT/EP2019/051247 (dated May 4, 2020).
Int'l Written Opinion (Form PCT/ISA/237) conducted in Int'l Appln. No. 18153240.9 (dated Feb. 27, 2019).
Europe Search Report/Office Action conducted in counterpart Europe Appln. No. 18153240.9-1007 (dated Jan. 7, 2019).

* cited by examiner

TRANSPORT UNIT FOR A LONG STATOR LINEAR MOTOR

The present invention relates to a transport unit for a long stator linear motor, the transport unit having a first guide side which is positioned laterally with respect to a longitudinal direction and on which a first guide group, which is symmetrical in terms of guidance, is arranged, and the transport unit having a first magnet side which is positioned laterally with respect to the longitudinal direction and extends in the longitudinal direction over a first longitudinal extent from a first start to a first end.

The present invention also relates to a transport unit for a long stator linear motor, the transport unit having a first guide side which is positioned laterally with respect to a longitudinal direction and on which a first guide group is arranged, and a first magnet side which is positioned laterally with respect to the longitudinal direction and extends in the longitudinal direction over a first longitudinal extent from a first start to a first end, the transport unit having a second guide side which is positioned laterally with respect to the longitudinal direction and on which a second guide group is arranged and the transport unit having a second magnet side which is positioned laterally with respect to the longitudinal direction and extends in the longitudinal direction over a second longitudinal extent from a second start to a second end.

The present invention also relates to a transport unit for a long stator linear motor, the transport unit having a first guide side which is positioned laterally with respect to a longitudinal direction and on which a first guide group is arranged, and having a second guide side which is positioned laterally at least with respect to the longitudinal direction and on which a second guide group is arranged, the second guide side being opposite the first guide side and the second guide group being configured so as to be equivalent to the first guide group in terms of guidance, and having a first magnet side which is positioned laterally with respect to the longitudinal direction and extends in the longitudinal direction over a first longitudinal extent from a first start to a first end, and having a second magnet side which is positioned laterally with respect to the longitudinal direction and extends in the longitudinal direction over a second longitudinal extent from a second start to a second end, the center of the first longitudinal extent and the center of the second longitudinal extent being opposite one another.

The present invention further relates to a method for determining the orientation of a transport unit of a long stator linear motor, the transport unit being symmetrical and/or equivalent in terms of guidance in the longitudinal direction.

In a long stator linear motor (LLM), a plurality of electric drive coils, arranged next to one another, are arranged along a transport path so as to be stationary, the drive coils forming a stator. A number of magnets are arranged on a transport unit in the form of permanent magnets or as electrical coils and/or as a short-circuit winding. The magnets are usually attached to the transport unit in the movement direction such that they can interact with the drive coils of the stator. The long stator linear motor can be in the form of a synchronous machine, both self-excited or externally excited, or in the form of an asynchronous machine. Owing to the interaction of the (electro)magnetic fields of the magnets and the drive coils, a propulsive force acts on the magnets of the transport unit, which in turn moves the transport unit in the movement direction. This is done by activating the individual drive coils in order to regulate the magnetic flux, which influences the amount of the propulsive force. Long stator linear motors are increasingly being used as a replacement for conventional continuous conveyors or rotary-to-linear translation units (e.g. rotary motor and/on conveyor belt, transmission belts, chains, etc.) in order to meet the requirements of modern, flexible logistics units.

Generally, such long stator linear motors are usually arranged in one plane, and therefore the transport units are moved along a planar transport path. The transport path can be composed of transport segments in the form of curve segments, straight lines or also switches. A transport unit must, of course, be suitably guided along the transport path and held thereon. For this purpose, guide groups consisting of individual guide elements are provided on the transport unit, which interact with path guide groups provided on the transport path, which in turn are composed of path guide elements. A guide group can, of course, consist of only one guide element. Any guide elements and path guide elements such as rollers, wheels, sliding elements, guiding surfaces, etc. can be used here. U.S. Pat. No. 9,428,347 B2 describes, for example, a long stator linear motor which has a transport unit having laterally attached guide wheels which roll on assigned guidance surfaces on the transport path. In order to keep the transport unit on the transport path, the magnetic force of the drive magnets on the transport unit is used. WO 2012/101004 A1 describes a long stator linear motor having a transport unit that is mechanically positively guided in the movement direction along the transport path, that is to say in such a way that the transport vehicle can only be moved in this one movement direction. This ensures that the transport vehicle is always guided and held. In WO 2015/042409 A1, safe guidance of the transport vehicle along the transport path is ensured by the fact that guide groups are present on two guide sides. A first and a second path guide group are provided on the transport path, which interact with the guide elements of the first and second guide groups of the transport unit. This means that the transport vehicle is always safely guided in the movement direction and that it is virtually impossible for said vehicle to fall off the transport path.

It may be the case that the orientations of the transport units are rotated relative to the stationary drive coils, for example by 180° about the longitudinal or the transverse axis, owing to the design of the transport path, in particular when transporting over switches. It is possible in principle to rotate the orientation about virtually any axis, provided that the transport unit and the transport path make this structurally possible. When mounting the transport unit on the stator, it is also possible for the transport unit to be placed, by mistake, in a manner in which it is rotated relative to the desired or intended orientation. However, it has so far not been possible to identify a correct standard orientation or an incorrect orientation of transport units on the transport path. WO 2010/085670 A1 and WO 2014/047104 A1 each disclose a long stator linear motor having a switch and transport units, each of which has three magnets on each side, two guide elements interacting with the respective associated path guide groups for each guide group. A polarity of the drive magnets is not described in more detail. EP 3 044 373 A1 also discloses a long stator linear motor having a switch, but having 6 drive magnets on each side of the transport units.

An object of the present invention is that of providing a transport unit for a long stator linear motor, the orientation of which, when used on the long stator linear motor during normal operation, can be determined easily, and that of specifying a method for determining the orientation of a transport unit.

This object is achieved in that the transport unit has, on the first magnet side at a first test distance starting from the center of the first longitudinal extent in the direction of the first end, a magnetic variable having a first value, and has, on the first magnet side at the first test distance starting from the center of the first longitudinal extent in the direction of the first start, a magnetic variable having a second value that differs from the first value. The first guide group is on the first guide side, but can also extend, for example, over two or more sides of the transport unit. The movement direction of the transport unit is referred to as the longitudinal direction; a direction transverse to said movement direction is referred to as the transverse direction. A direction resulting in the sense of a right-hand helix from the longitudinal direction and the transverse direction is regarded as the vertical direction. The origin of this Cartesian coordinate system is placed in the center of a main body of the relevant transport unit, whereby the coordinate system is moved together with the transport units, but is not rotated therewith during rotation. "Arranged laterally" thus refers to the origin and means that there is an offset in the transverse direction and/or vertical direction. It is therefore fundamentally unimportant whether the guide side on the transport unit is in the transverse direction and/or in the vertical direction, starting from the origin. It is essential that the first guide group is symmetrical in terms of guidance. "Symmetrical in terms of guidance" means that the guide group is suitable for interacting with a first path guide group of a transport path of a long stator linear motor in order to allow the transport unit to move in the relevant movement direction; in this case, therefore, in the longitudinal direction. However, "Symmetrical in terms of guidance in regard to a guide element also means that the guide element can continue to interact with the first path guide group of the transport path after rotation of the transport unit by 180° about an axis lying in the transverse direction, in order to allow movement of the rotated transport unit in the longitudinal direction.

For example, if a guide group consists of only one guide element attached to the guide side, e.g. a roller, which interacts with a path guide element of a path guide group, e.g. in the form of a rail, this guide element allows guidance in the movement direction. However, the guide group must also allow guidance in the relevant longitudinal direction after rotation by 180 degrees about the transverse direction in order to be symmetrical in terms of guidance. This is fundamentally provided in the case of a roller as the single guide element of a guide group, in particular if the latter is arranged centrally on the transport unit with respect to the vertical direction. However, if the roller is not arranged centrally with respect to the vertical direction, that is to say at the level of the origin, the transport unit is guided, following rotation by 180 degrees about the transverse direction, in the vertical direction so as to be offset on the transport path. Therefore, although the transport unit is fundamentally symmetrical in terms of guidance, this possible offset must be taken into account in the structural design of the long stator linear motor and may also be undesirable.

If the guide group consists of a guide element in the form of a first roller, which is attached at a first distance in a positive vertical direction above the transport unit, and a guide element in the form of a similar second roller, which is attached at the same distance in a negative vertical direction, guide symmetry is provided by the guide group. Of course, the design of the transport unit itself must also allow rotation about the transverse direction. The associated path guide group, which in this case consists, for example, of path guide elements in the form of a first rail in a positive vertical direction and a similar second rail in a negative vertical direction, must also be able to interact with the rollers when the transport unit is oriented "normally" and when the transport unit is rotated by 180 degrees in the longitudinal direction. This means that the path guide groups must, of course, be equally symmetrical in terms of guidance. If the rollers and associated rails in the positive and negative vertical directions were not interchangeably compatible (this does not necessarily mean that they are constructed identically), they are not symmetrical in terms of guidance, although guidance in the longitudinal direction is possible, but not after rotation of the transport unit by 180 degrees in the longitudinal direction.

The object is also achieved by a method according to the invention, in which an actual value of a magnetic test variable is determined at a test point on a magnet side positioned laterally with respect to the longitudinal direction, and compared with a reference value, and, if the actual value does not match the reference value, incorrect orientation of the transport unit is inferred. This means that if the actual value matches the reference value, the correct standard orientation of the transport unit is inferred. If an incorrect orientation is detected, a signal can be output, for example.

The method according to the invention allows a simple check of the orientation of the transport device with respect to a transport path, that is to say whether the transport unit is in the standard orientation or whether it has been rotated by 180 degrees about an axis lying in the transverse direction. Of course, a prerequisite for this is guide symmetry. In order to identify an orientation deviating from the standard orientation, the reference value of the magnetic test variable, which corresponds to the actual value of the test variable expected in the standard orientation at the relevant test point, must be known, so that it can be compared with a determined, actual value of the magnetic test variable at this test point. If the actual value of the magnetic test variable does not match the reference value, it can be assumed that the transport unit is rotated about an axis lying in the transverse direction.

The method according to the invention can be used with transport units according to the invention if the test point corresponds to the test distance. It is therefore fundamentally determined whether the test point is positioned so as to correspond to the test distance in the positive longitudinal direction, that is to say in the movement direction, or the test distance in the negative longitudinal direction, i.e. against the movement direction. The reference value of the magnetic test variable, for example, would thus correspond to the first value (at the first test distance in the direction of the first end). If the actual value is identical to the reference value, the transport unit is in the standard orientation. If the actual value corresponds to the second value (at the first test distance in the direction of the first start), and therefore not to the first value, the transport unit is thus in the incorrect orientation.

When determining the orientation of the transport unit, an actual value of the magnetic test variable is thus determined at a test point, the transport unit being on the transport path. As described above, the test variable can correspond to the magnetic variable, which means that the reference value corresponds to the value and, in standard orientation, also to the actual value. However, the test variable can also be created by the magnetic circuit, which is formed by the drive coils of the transport path together with the magnets and/or magnetically conductive materials (e.g. magnet plates) of the transport unit. A test variable that does not correspond to the magnetic variable can therefore also be determined. The actual value of the test variable and the value of the magnetic variable must, of course, correlate with one another, that is to say be derivable from one another. Instead of actual values, curves can, of course, also be observed and compared with reference curves.

Checking the actual value of the magnetic test variable to determine a rotation about an axis lying in the transverse direction can take place regardless of whether or not there is a second number of magnets on a second magnet side.

The object is also achieved by a transport unit which has a first guide group and a second guide group which are symmetrical and/or equivalent to one another in terms of guidance, the transport unit having, on the first magnet side at a first test distance starting from the center of the first longitudinal extent in the direction of the first end, a magnetic variable having a first value, the transport unit having, on the first magnet side at the first test distance starting from the center of the first longitudinal extent in the direction of the first start, a magnetic variable having a second value that differs from the first value, the transport unit having, on the first magnet side at a first test distance starting from the center of the first longitudinal extent in the direction of the first end, a magnetic variable having a first value, the transport unit having, on the first magnet side at the first test distance starting from the center of the first longitudinal extent in the direction of the first start, a magnetic variable having a second value that differs from the first value, the transport unit having, on the second magnet side at a second test distance starting from the center of the second longitudinal extent in the direction of the second end, a magnetic variable having a third value, and the transport unit having, on the second magnet side at the second test distance starting from the center of the second longitudinal extent in the direction of the second end, a magnetic variable having a fourth value that differs from the third value.

If the two guide groups are each symmetrical in terms of guidance, applying on the second magnet side the above-mentioned method according to the invention, in addition or instead, the orientation of the transport unit can be determined by checking the actual value of a magnetic test variable at the test point. The test point again corresponds to the test distance starting from the center of the longitudinal extent. If the actual value and the reference value match, it can be assumed that the transport unit is in the standard orientation. If they do not match, it can be assumed that the transport unit has been rotated by 180 degrees about an axis lying in the transverse direction. Of course, the prerequisite is always that a reference value of the magnetic variable at the test point is known.

If the guide groups are configured to be equivalent to one another in terms of guidance, the first guide side is advantageously opposite the second guide side, and the first magnet side is opposite the second magnet side, and the center of the first longitudinal extent is opposite the second longitudinal extent, on the first magnet side at a test position in the longitudinal direction, a magnetic variable having a fifth value and on the second magnet side at the test position in the longitudinal direction, a magnetic variable having a sixth value, which differs from the fifth value. "Opposite" here means in relation to the origin or the axis of the longitudinal direction running through it. The two magnet sides can also have the same longitudinal extent, whereby start and end of the first and second magnet side are also opposite one another adjacent to the center of the longitudinal extent.

For the guide groups, "equivalent in terms of guidance" means that they are interchangeable, that is to say they allow the transport unit to rotate by 180 degrees about an axis lying in the longitudinal direction or even an axis lying in the vertical direction. Prior to such a rotation, the guide elements of the first guide group are in interaction, for example in engagement, with the path guide elements of the first path guide group, and the guide elements of the second guide group are in engagement with the path guide elements of the second path guide group. If the first guide group and the second guide group are symmetrical to one another, for example, in the longitudinal direction, equivalence to one another in terms of guidance can be ensured. After the aforementioned rotation about an axis lying in the longitudinal direction, the guide elements of the first guide group are positioned so as to interact with the path guide elements of the second path guide group, and the guide elements of the second guide group are positioned so as to be in engagement with the path guide elements of the first path guide group.

By detecting the actual value of a magnetic test variable at a test point, a rotation by 180 degrees about an axis lying in the longitudinal direction can be detected in such a transport unit by the method according to the invention. For this purpose, the test point corresponds to the test position on the first or second magnet side and a comparison of the actual value of the test variable at the test point with a suitable reference value follows. The reference value of the test variable corresponds, for example, to the fifth value and the actual value is determined at the test point in the form of the first test position on the supposed first magnet side. If the determined actual value of the magnetic test variable matches the reference value, it can be assumed that the transport unit is in the standard orientation, that is to say that the test point is actually on the first magnet side. However, if, for example, the sixth value is determined as the actual test variable and therefore does not match the reference value, it can be assumed that the unit is rotated about an axis lying in the longitudinal direction. It was therefore determined that the test point is on the second magnet side.

It is particularly advantageous if the first test distance corresponds to the second test distance and the test position. Rotations about both an axis lying in the longitudinal direction and an axis lying in the transverse direction can thus be identified by checking the value of the magnetic variable at one point (first test distance corresponding to the second test distance corresponding to the test position). This means that in order to determine the orientation of the transport unit both about an axis lying in the longitudinal direction and about an axis lying in the transverse direction, only an actual value of the magnetic test variable has to be determined at a test point of the transport unit. Depending on the type of (non-) rotation, this test point thus corresponds to the first test distance or the second test distance and/or the test position, which, as already described, is determined by comparing the actual value with a reference value. In this case, however, a rotation about both the transverse direction and the longitudinal direction would be incorrectly interpreted as the standard orientation. Such a double rotation before the detection of a simple rotation is very unlikely, however, which is why this case can be disregarded. If the guide groups are equivalent in terms of guidance, the transport unit could also be rotated about the vertical direction. However, such a rotation would not be identifiable in the above-described design.

It is also advantageous if all the values of the magnetic variables on the first magnet side differ from the values of the magnetic variables on the second side in the longitudinal direction. This means that a rotation about the transverse direction can be identified on the basis of the actual value at any test point along a magnetic side, provided that, of course, the appropriate reference value is known.

It is particularly advantageous if the values of the magnetic variables on the first magnet side are asymmetrical about the center of the first longitudinal extent. This means that a rotation about an axis lying in the transverse direction can be identified on the basis of the actual value at any test point along the first magnet side and, of course, likewise if the reference value is known. If a second magnet side is present, the values of the magnetic variable on the first magnet side differ from the values of the magnetic variables on the second side in the entire longitudinal direction; of course, this would therefore also mean that the values of the magnetic variables on the second magnet side are asymmetrical about the center of the second longitudinal extent.

The object is also achieved by a transport unit according to the invention, which has, on the first magnet side at a first test distance starting from the center of the first longitudinal extent in the direction of the first end, a magnetic variable having a first value, and has, on the first magnet side at the first test distance starting from the center of the first longitudinal extent in the direction of the first start, a magnetic variable having a second value that corresponds to the first value, the transport unit having, on the second magnet side at a second test distance starting from the center of the second longitudinal extent in the direction of the second end, a magnetic variable having a third value, and the transport unit having, on the second magnet side at the second test distance starting from the center of the second longitudinal extent in the direction of the second start, a magnetic variable having a fourth value that differs from the third value, the first and second values differing from the third and fourth values. Using the method according to the invention, by checking the actual value of a magnetic test variable on the first and/or second magnet side at the first test distance, it can therefore be determined whether the transport unit has been rotated about the vertical direction. Likewise, by checking the actual value of the magnetic test variable at the first test distance, a rotation about an axis of the transverse direction lying in the longitudinal direction can be identified, but not a rotation about an axis lying in the transverse direction, even if this rotation would be possible owing to the equivalence in terms of guidance. A prerequisite for a rotation about the vertical direction or longitudinal direction is mutual equivalence of the guide groups in terms of guidance. Identification of an orientation corresponding to or deviating from the standard orientation can again be carried out by comparing the particular determined actual value of the magnetic test variable with a reference value. The method can be applied as described above and is not repeated here in detail.

All the values of the magnetic variables in the longitudinal direction on the first magnet side can have a different value than on the second magnet side, the values of the magnetic variables on the first magnet side advantageously being symmetrical about the center of the first longitudinal extent and the values of the magnetic variables on the second magnet side being symmetrical about the center of the second longitudinal extent. A rotation about the transverse direction or vertical direction is thus possible by determining the actual value of the magnetic variable, both on the first and on the second magnet side, at any test point, which, of course, again requires the particular reference value to be known.

The magnetic variable can be predefined by a magnetic resistance, preferably of a first magnet plate attached to the first magnet side, and/or a second magnet plate attached to the second magnet side. Magnet plates usually consist of a highly magnetically conductive material and, for example, a first and/or second number of magnets are attached in each case to such magnet plates. For example, the magnetic resistance of the transport unit can therefore be varied in the longitudinal direction, for example of a main body of the transport unit or also a magnet plate attached thereto at particular points, such as at a test distance or at a test point. This can be achieved by different thicknesses and/or material compositions, recesses, etc. From this perspective, the magnetic variable is predefined solely by the transport unit. However, the magnetic variable does not have to represent a magnetic resistance, but can also represent, for example, a magnetic polarity or a magnetic flux, which is known to be directly influenced by the magnetic resistance, generated by magnets arranged on the transport unit.

The values of the magnetic variables at the particular test distances and/or test positions can thus be defined on the transport unit by structural measures (strength, position and polarity of the magnets, material and thickness of the magnet plates, etc.).

The magnetic test variable can be determined without any sensors, for example by identifying the existing magnetic circuit by means of an already existing coil controller. For this purpose, a high-frequency voltage signal is impressed into the drive coils, for example, even when the transport units are at a standstill, and the current signal which arises, that is to say a current response, is analyzed. The relationship between current and voltage depends, inter alia, on the inductance, which in turn depends on the magnetic resistance. If, according to the invention, the magnetic resistance is different at different test distances and/or test positions of the transport unit, a current path of the individual coils differs depending on the orientation of the transport unit. By determining and analyzing a current response and comparing actual values and reference values of the test variables, an orientation of the transport unit can be inferred.

If the transport unit is in motion, a back EMF voltage, for example, which is caused by the movement of the transport unit, can be used to infer the actual value of a magnetic test variable. The back EMF voltage is proportional to the change over time of the magnetic flux in the magnetic circuit. If the magnetic flux changes owing to different values of the magnetic variable, this can be determined with the aid of the drive coils and thus an orientation of the transport unit can be inferred. If, for example, a lower magnetic resistance is provided at the first test distance in the direction of the start of the magnet side than in the direction of the end of the magnet side, a higher voltage is induced at the start than at the end owing to the higher magnetic flux.

Very particularly advantageously, a first number of magnets is arranged on the first magnet side, and/or a second number of magnets is arranged on the second magnet side, each of which is provided with polarity in the transverse direction, the magnetic variable being specified by the polarity of the first number of magnets or the second number of magnets. A different polarity in the particular test distances or test positions allows a particularly simple determination of the orientation of the transport unit. Of course, the polarity also influences the magnetic flux in the magnetic circuit, and can thus be determined from the magnetic flux in a manner similar to that described above.

However, the magnetic variable at a test distance or a test position can also be identified by suitable sensors attached to the transport path, for example magnetic field sensors. The strength or the polarity of a magnetic field can be measured using such magnetic field sensors, and the polarity of the magnetic field can also be measured using certain magnetic field sensors, as a result of which an orientation of the transport unit can be inferred.

The value of the magnetic variable, for example the polarity of the magnets, is always considered to be a reference point on one magnet side, starting from the center of the transport unit. In particular, if the polarity is used as a magnetic variable, the polarity of the side of the magnets facing outwards is compared. The polarity of the inward-facing side of the magnets could, of course, also be compared in an equivalent manner, since these are polarized in the transverse direction.

If, for example, the values of the magnetic variables in the longitudinal direction are different on the two magnet sides, this means that, in the event that the magnetic variable is specified by the polarity of the magnets, all magnets of the first magnet side in the longitudinal direction have a different polarity on the outside than the magnets of the second magnet side. This means that the magnets of the first magnet side are polarized asymmetrically to the magnets of the second magnet side, with respect to the longitudinal direction, whereby a rotation about the longitudinal direction can be identified on the basis of the polarity of each magnet, that is to say at any point.

For example, identically designed magnets of the magnet sides can be alternately positively and negatively polarized in the longitudinal direction. Symmetry about the center of the longitudinal extent thus results in an odd number of magnets for each magnet side; asymmetry results in an even number.

A long stator linear motor can have at least one transport unit according to the invention and a transport path, the transport path having a first path guide group and/or a second path guide group which interacts with the first guide group and/or the second guide group in order to guide the at least one transport unit along the transport path in a movement direction.

This means that a long stator linear motor can have a transport path having a first path guide group, the at least one transport unit having a first guide group. The first path guide group thus interacts with the first guide group in order to guide the at least one transport unit along the transport path in a movement direction. As described above, the transport unit can be rotated about an axis lying in the transverse direction, whereupon the first path guide group again interacts with the first guide group and at least one transport unit is "rotated" along the transport path in a movement direction.

A long stator linear motor can also have a transport path having a first path guide group and a second path guide group, it being possible for the at least one transport unit to have a first guide group and a second guide group. The first path guide group interacts with the first guide group or the second guide group and the second path guide group interacts with the second guide group or the first guide group. The at least one transport unit is fundamentally guided in a standard direction along the transport path in a movement direction. The transport unit can be rotated according to the invention as described above about an axis lying in the transverse direction, longitudinal direction or vertical direction, it also being possible for the first guide group and the second guide group to swap places and then interact with the relevant other path guide group. After the rotation, the transport unit can thus be "rotated" along the transport path in the movement direction.

The present invention is described in greater detail below with reference to FIGS. 1 to 6d which show, by way of example, advantageous embodiments of the invention in a schematic and non-limiting manner. In the figures.

Figure 1:
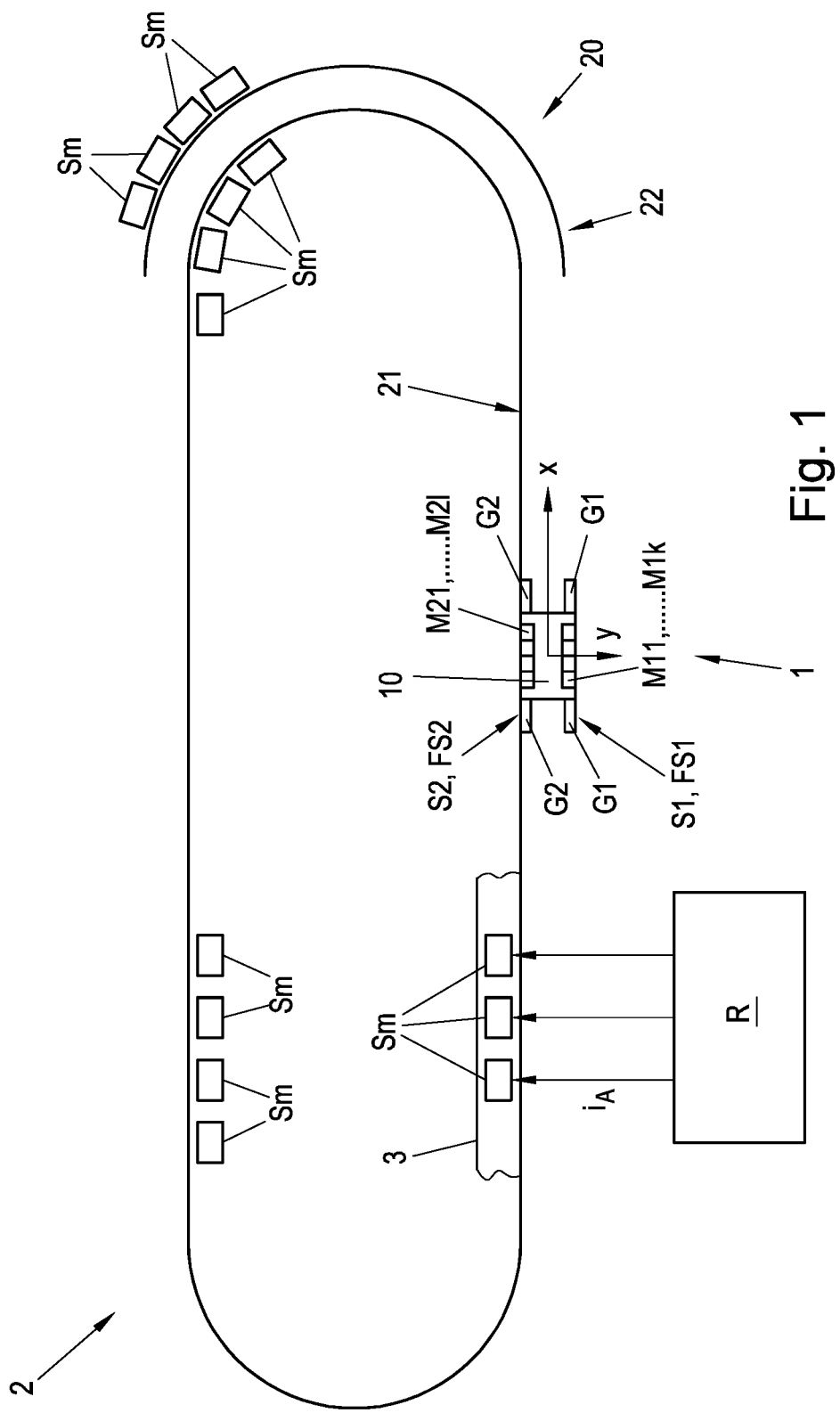
FIG. 1 shows a schematic long stator linear motor.
Figure 6A:
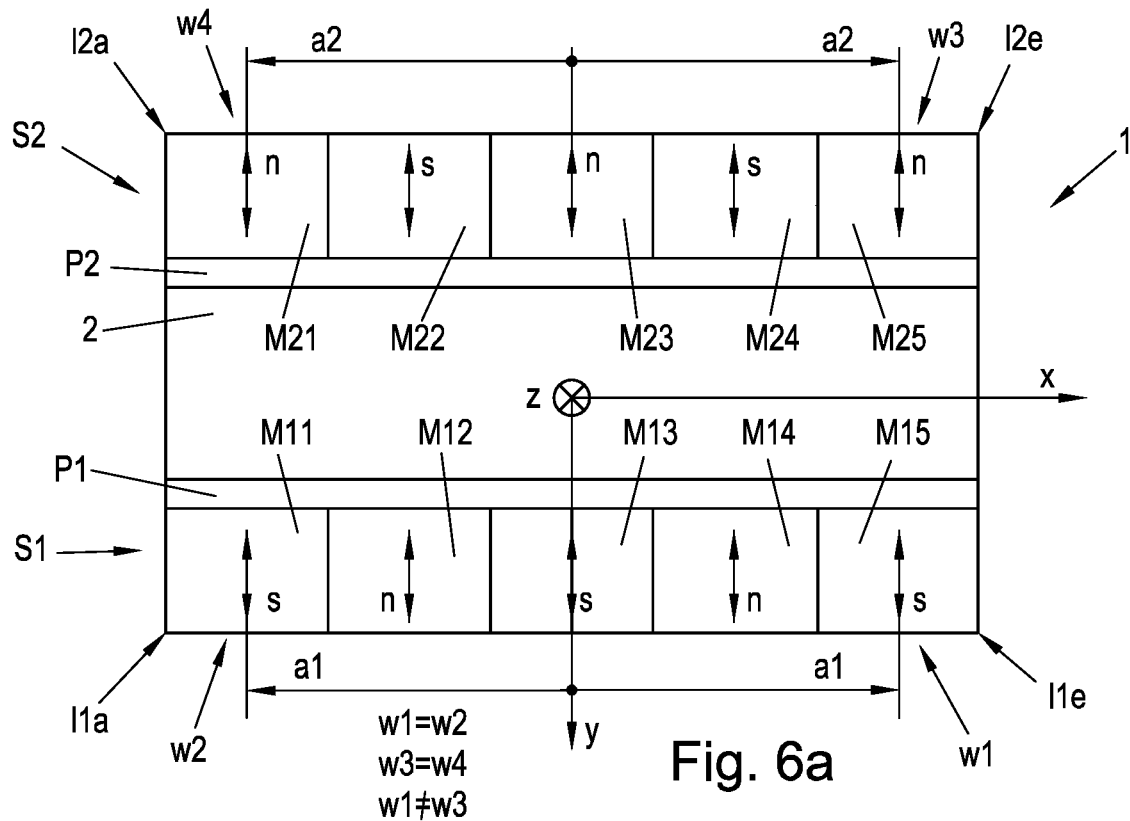
FIG. 6a shows a second embodiment of a transport unit having two magnet plates.
Figure 6B:
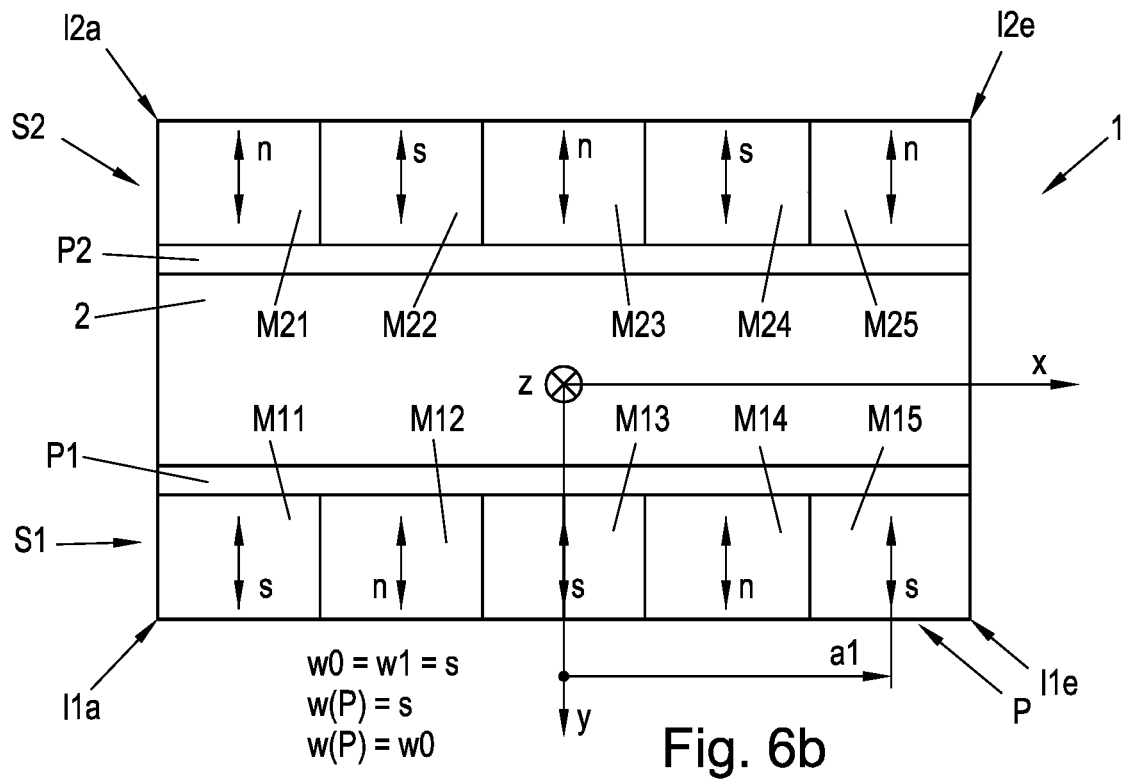
FIG. 6b shows the second embodiment of the transport unit in standard orientation.
Figure 6C:
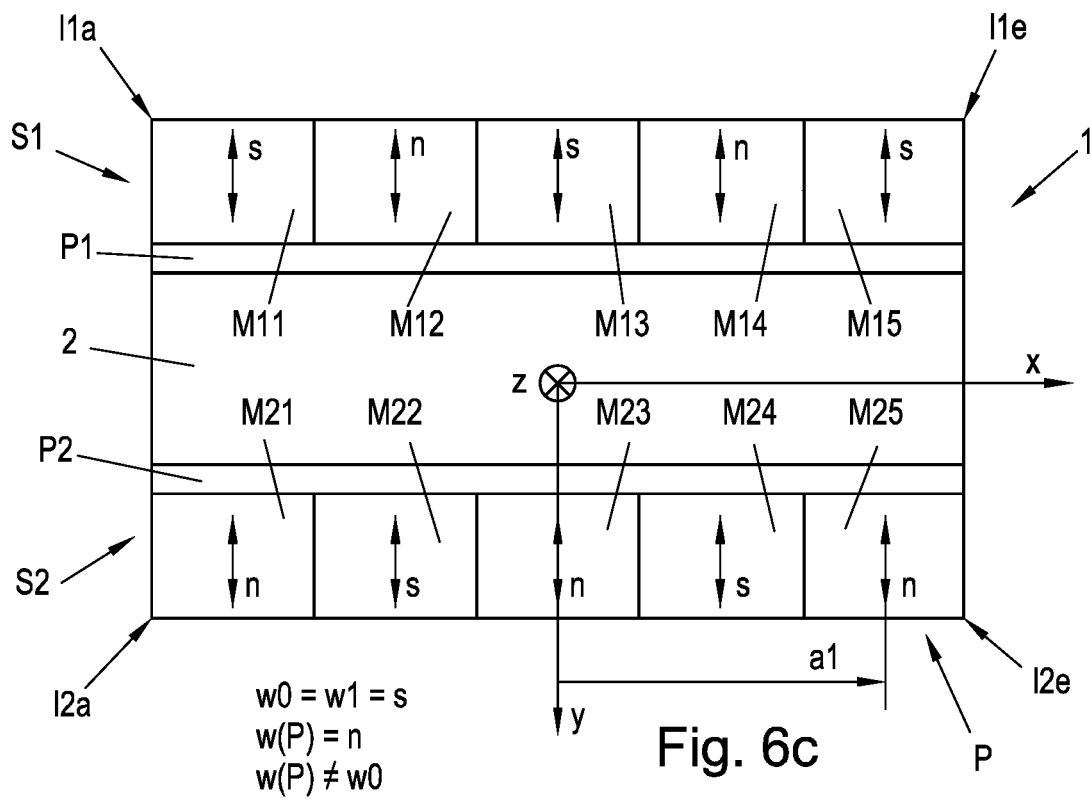
FIG. 6c shows the second embodiment of the transport unit rotated about an axis lying in the longitudinal direction.
Figure 6D:
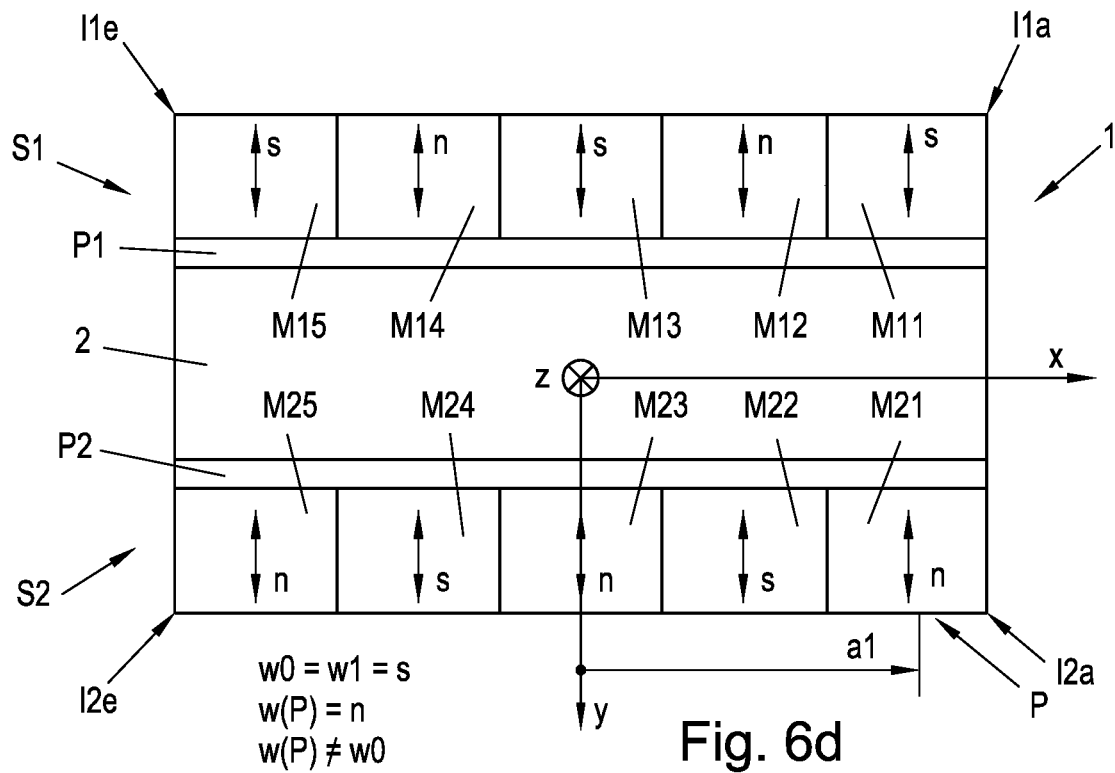

FIG. 6d shows the second embodiment of the transport unit rotated about an axis lying in the vertical direction; and FIG. 1 is a simple example of a long stator linear motor 2. The long stator linear motor 2 is designed here as a closed transport path 20. A plurality of drive coils Sm are arranged on the transport path 20 and, under the control of a control unit R (only shown for a few drive coils Sm), are energized with a coil current $i_A$ (as a vector in magnitude and direction) in order to generate a moving magnetic field. The drive coils Sm arranged next to one another in the movement direction are arranged on the transport path 20 on a stationary support structure 3 (only indicated in FIG. 1). The transport units 1 are moved along the transport path 20 in a movement direction, and are each suitably guided on the stationary transport path 20.

From the perspective of a transport unit 1, the movement direction corresponds to the longitudinal direction x. A transport unit 1 has a laterally arranged first number k of magnets M11, . . . , M1k, which are in this case on a first magnet side S1 positioned laterally with respect to the longitudinal direction x. As shown in FIG. 1, the transport unit 1 advantageously also has a second number I of laterally arranged magnets M21, . . . , M2I, which are in this case on a second magnet side S2 positioned laterally with respect to the longitudinal direction x, the second magnet side S2 being opposite the first magnet side S1. If the transport unit 1 has in each case a first number k of magnets M11, . . . , M1k and/or a second number I of magnets M21, . . . , M2I on two sides (in this case the magnet sides S1, S2), drive coils Sm can accordingly be provided on both sides of the transport path 20 (viewed in the movement direction), which drive coils interact with the particular magnets M11, . . . , M1k, M21, . . . , M2I in order to cause movement of the transport units 1. For this purpose, preferably only the drive coils Sm in the region of the magnets M11, . . . , M1k, M21, . . . , M2I are energized, it also being possible for this region to comprise drive coils Sm which are located upstream and/or downstream of the transport unit 1. Of course, more than one transport unit 1 can also be moved along the transport path 20, it being possible for each transport unit 1 to be moved regardless of the other transport units 1 (in direction, position, speed and acceleration) by appropriately energizing the drive coils Sm in the region of the transport unit 1. Depending on the application and as needed, the transport path 20 can have any shape, and can comprise closed and/or open path portions. The transport path 20 does not have to lie in one plane, but can also be arbitrarily guided in space. The fundamental operating principle of a long stator linear motor 1 is well known and therefore this will not be discussed further here.

A three-dimensional Cartesian coordinate system is used to describe the orientation, in which the x-direction is referred to as the longitudinal direction x, the y-direction as the transverse direction y and the z-direction, which is known to result in the sense of a right-hand helix from the longitudinal direction and the transverse direction, as the vertical direction z. The origin of the Cartesian coordinate system is placed in the center of a main body 2 of the relevant transport unit 1, whereby the coordinate system is moved together with each of the transport units 1. With regard to the x-direction and z-direction, the geometric center with respect to the magnets M11, . . . , M1$k$, M21, . . . , M2$l$ can be considered to be the center. If two magnet sides S1, S2 are provided, the center can be in the y-direction centrally between the two magnet sides S1, S2. It is assumed that the transport unit 1 moves on the stator of the long stator linear motor 2 in the longitudinal direction x. The longitudinal direction x always points in the movement direction of the transport unit 1, which is fundamentally predefined by the transport path 20. Of course, at a curved path portion of the transport path 20, the movement direction is the tangent to the curve. Depending on the design of the transport path, the movement direction can in principle be oriented as desired in space.

Of course, the orientation of the axes of the coordinate system is not limited to the design of the drawings, however, but instead is in principle arbitrary. For example, a long stator linear motor 1 could be realized, in which the drive coils S and the magnets M11, . . . , M1$k$, M21, . . . , M2$l$ are not laterally arranged but instead are arranged above and/or below. As a result, the y- and z-axes, for example, having the correct signs would switch places.

Figure 2:
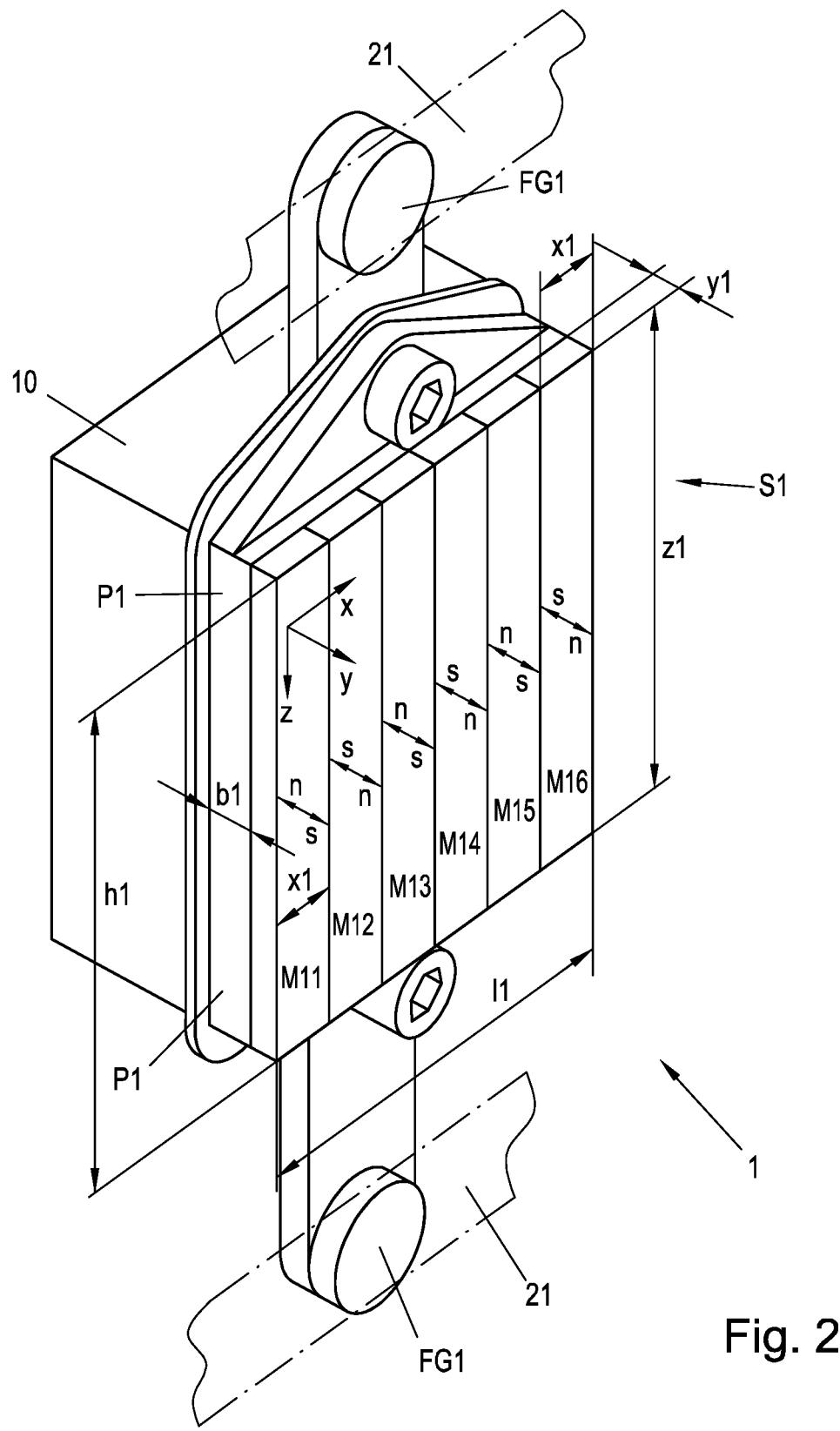
FIG. 2 is a perspective view of a transport unit having a magnet plate.

A first guide group FG1 is arranged on at least one first guide side FS1 of the transport unit 1 in the positive transverse direction y. As shown in FIG. 1, the first guide side FS1 can advantageously be identical to the first magnet side S1, but can also be on a different side of the transport unit 1. As indicated in FIG. 1, the first guide group G1 can comprise elements in the longitudinal direction x upstream and downstream of the main body 10. Alternatively, the first guide group FG1 can also consist of guide elements which are above and below the main body 10 in the vertical direction z, as indicated in FIGS. 2 and 3. Of course, the first guide group FG1 can also consist of only one guide element in the movement direction x upstream or downstream of, in the vertical direction z above or below, or in the positive transverse direction y next to the main body 10 or can be composed of any combination of such guide elements.

In an analogous manner, a second guide group FG2 can also be arranged on a second guide side FS2 of the transport unit 1 in the negative transverse direction −y, which in turn can consist of individual guide elements which are in the longitudinal direction x upstream and/or downstream of, or in the vertical direction z above and/or below, and/or in the negative transverse direction −y next to the main body. The second guide group FG2 can, but need not necessarily, be configured in the same way as the first guide group FG1.

At least one path guide group 21, 22 must always be provided on the transport path 20, which interacts with an element of a guide group FG1, FG2 on a guide side FS1, FS2 of the transport unit 1 in order to guide the transport unit 1 along the transport path 20 in the movement direction, that is to say in this case the longitudinal direction x. If the transport unit 1 is equipped with two guide groups FG1, FG2 on two guide sides, the transport path 20 can be at least partially equipped on both sides with path guide groups 21, 22, which interact with the elements of the guide groups FG1, FG2 of the transport unit 1. Two-sided guidance of the transport unit 1 is thus realized in a two-sided portion of the path. In a two-sided path portion, the transport vehicle 1 is thus guided in the movement direction x by the interaction of the guide groups FG1, FG2 with the path guide groups 21, 22 on both guide sides FS1, FS2. Of course, one-sided guidance can also be provided at least in part, even if the transport unit 1 has two guide groups FG1, FG2 on two guide sides, as is also shown in FIG. 1. Here, two-sided guidance is provided only on two transport segments on the right in FIG. 1. In a one-sided path portion, a path guide group 21, 22 is arranged only on one side of the transport path 20 in order to guide the transport unit 1 in the movement direction x regardless of the design of the opposite side.

The guide groups G1, G2 can comprise various elements, such as rollers, wheels, sliding elements, guiding surfaces, sliding surfaces, etc., it being imperative, of course, that the path guide elements 21, 22 be designed in such a way that the particular elements of the guide groups FG1, FG2 can be guided therein. The drive coils Sm are preferably arranged in the region of the path guide group 21, for example also on the support structure 3, in order to achieve a compact design. It is, of course, also conceivable that the drive coils Sm are on different sides than the path guide groups 21, 22 and/or path guide elements, whereby of course the drive magnets do not have to be positioned on the side of the elements of the guide groups FG1, FG2 either.

The guide groups FG1, FG2 and the path guide groups 21, 22 can, of course, be designed in a wide variety of ways. It is crucial for the invention that in a transport unit having only one guide group FG1 and an associated first path guide group 21 on the transport path 20, the guide group FG1 is symmetrical in terms of guidance. This means that the first guide group FG1 is suitable for interacting with a first path guide group 21 of the transport path 20 in order to allow movement of the transport unit 1 in the movement direction, that is to say in this case in the longitudinal direction x, and that, after rotation of the transport unit 1 by 180° about an axis lying in the transverse direction y, the first guide group FG1 can continue to interact with the first path guide group 21 of the transport path 20, in order to allow movement of the rotated transport unit 1 in the movement direction. This means that the first guide group FG1 can interact "forwards" and "backwards" with the first path guide group 21. After rotation, the movement direction continues to correspond to the positive longitudinal direction x, since the coordinate system was not rotated with the transport unit 1. If a second guide group FG2 is present and if it interacts with a second path guide group 22 at least in path portions 20, then the requirement of guide symmetry also applies to the second guide group FG2.

The guide symmetry is therefore a basic requirement for a possible rotation of the transport unit 1 by 180 degrees about an axis lying in the transverse direction y. If such a rotation has taken place, for example owing to switches on the transport path 20 or manually rotated transport units 1 placed on the transport path 20, then, according to the invention, detection of the incorrect orientation is made possible.

There is a fundamental difference between transport units 1 having a first number k of magnets M11, . . . , M1k arranged on a first magnet side S1 and transport units 1 having an additional second number I of magnets M21, . . . , M2I arranged on a second, but preferably not necessarily opposite the first, magnet side S1. The first number k of magnets M11, . . . , M1k and/or the second number I of magnets M21, . . . , M2I are attached to a transport unit 1 in such a way that they can interact with the drive coils of the LLM stator arranged next to one another in the movement direction of the transport unit 1. For this purpose, the first number k of magnets M11, . . . , M1k can be mounted on a first magnet plate P1 and the second number I of magnets M21, . . . , M2I on a second magnet plate P2. The first number k of magnets M11, . . . , M1k on the first side and/or second number I of magnets M21, . . . , M2I on the second side can interact with the assigned drive coils on one side of an LLM stator.

According to the invention, the transport unit 1 has, on the first magnet side S1, which extends in the longitudinal direction x over a first longitudinal extent I1 from a first start I1a to a first end I1e, at a first test distance a1 starting from the center of a first longitudinal extent I1 in the direction of the first end I1e, a magnetic variable having a first value w1, and has, at the first test distance a1 starting from the center of the first longitudinal extent I1 in the direction of the first start I1a, a magnetic variable having a second value w2, which differs from the first value w1, as described in detail below with reference to FIGS. 2 and 3.

If the magnetic variable, for example, is a magnetic resistance of the first magnet plate P1, and/or the second magnet plate P2, it must be ensured that a value of the magnetic resistance at a first test distance a1 starting from the center of a first longitudinal extent I1 in the direction of the first end I1e has a different value than the value of the magnetic resistance at the first test distance a1 starting from the center of the first longitudinal extent I1 in the direction of the first start I1a. This can be achieved, for example, by means of different thicknesses and/or material compositions, recesses, etc. in the magnet plates P1, P2 or other magnetically conductive elements of the transport device 1.

Fundamentally, the type of magnetic variable can be chosen arbitrarily by a person skilled in the art. In the following, the invention will be described by way of example with reference to the polarity n, s of the first number k of magnets M11, . . . , M1k and/or second number I of magnets M21, . . . , M2I as the magnetic variable. The focus here is intended to be on the arrangement and polarity of a first number k of magnets M11, . . . , M1k, in this case, by way of example, attached to the first magnet plate P1, and/or (if present) for a second number I of magnets M21, . . . , M2I, here, for example, arranged on a second magnet plate P2.

FIG. 2 is a perspective view of a transport unit 1. A transport unit 1 of a long stator linear motor fundamentally consists of a main body 10, assumed for the sake of simplicity to be cuboidal and having a first magnet side S1. The first magnet side S1 extends in the longitudinal direction x over a first longitudinal extent I1 and in the vertical direction z over a first height h1. Any other known components of a transport unit 1, such as component receptacles, are, for the sake of simplicity and because they are not important for understanding the invention, not shown. A first number k of plate-shaped magnets M11, . . . , M1k are arranged on a first magnet plate P1 on the first magnet side S1 of the main body 10 in the positive transverse direction y. A first number k of magnets M11, . . . , M1k extends in the longitudinal direction x over a first magnet length x1 and in the vertical direction z by a first magnet height z1 and has a first magnet thickness y1 in the transverse direction y.

A first guide group FG1 is attached in a positive vertical direction z to a first guide side FS1 and an additional first guide group FG1 is attached in a negative vertical direction z to a second guide side FS2 on the main body 10. The first guide groups FG1 interact with first path guide groups 21 (outlined with dot-dash lines) and are symmetrical in terms of guidance, that is to say that the transport unit 1 can be guided in the longitudinal direction x both in the standard orientation but also after a 180-degree rotation about an axis lying in the transverse direction. This is achieved in this case in that the first guide group FG1 attached in the negative vertical direction −z is symmetrical to the first guide group FG1 attached in the positive vertical direction z. The associated first path guide groups 21 must, of course, also be symmetrical in terms of guidance, which is also achieved here by symmetry of the path guide groups 21.

The transport unit 1 shown in FIG. 2 has a first number, in this case k=6, of magnets M11, M12, M13, M14, M15, M16 on a first magnet side S1, which are attached here to a first magnet plate P1. The individual k=6 magnets M11, . . . , M16 have in this case (conventionally, but not absolutely necessarily) identical dimensions (that is to say first magnet length x1, the first magnet height z1 and the first magnet thickness y1) and, for the sake of a simpler illustration, extend in the vertical direction z to the edge of the first side of the main body 10. In addition, the k (in this case six) magnets M11, . . . , M1k are advantageously arranged next to one another in the longitudinal direction x up to the edge of the first side of the main body 10, which means that the sum of the magnet lengths x1 of the first number k of magnets M11, . . . , M1k advantageously corresponds to the first longitudinal extent I1 of the main body, if the k magnets M11, . . . , M1k are in direct contact with one another. In the embodiment shown, the first magnet side S1 advantageously corresponds to the first guide side FS1.

The k (in this case six) magnets M11, . . . , M1k each have a polarity in the transverse direction y from north n to south s or vice versa, which means that the side facing the origin, that is to say the center of the transport unit 1 (negative transverse direction −y) of the individual k magnets M11, . . . , M1k, is polarized differently than the side facing away from the center (positive transverse direction y). By contrast, in the vertical direction z and in the longitudinal direction x, the first number k of magnets M11, . . . , M1k each have a uniform polarity n, s. In FIG. 1, the k=6 magnets M11, . . . , M1k are alternately polarized, which results in a pole sequence n-s-n-s-n-s in the longitudinal direction on the side facing the center for the polarity of the k=6 magnets M11, . . . , M1k and accordingly a pole sequence s-n-s-n-s-n on the side facing away from the center. As a result, the polarity n, s on the side facing away from the center should always be compared.

Figure 3A:
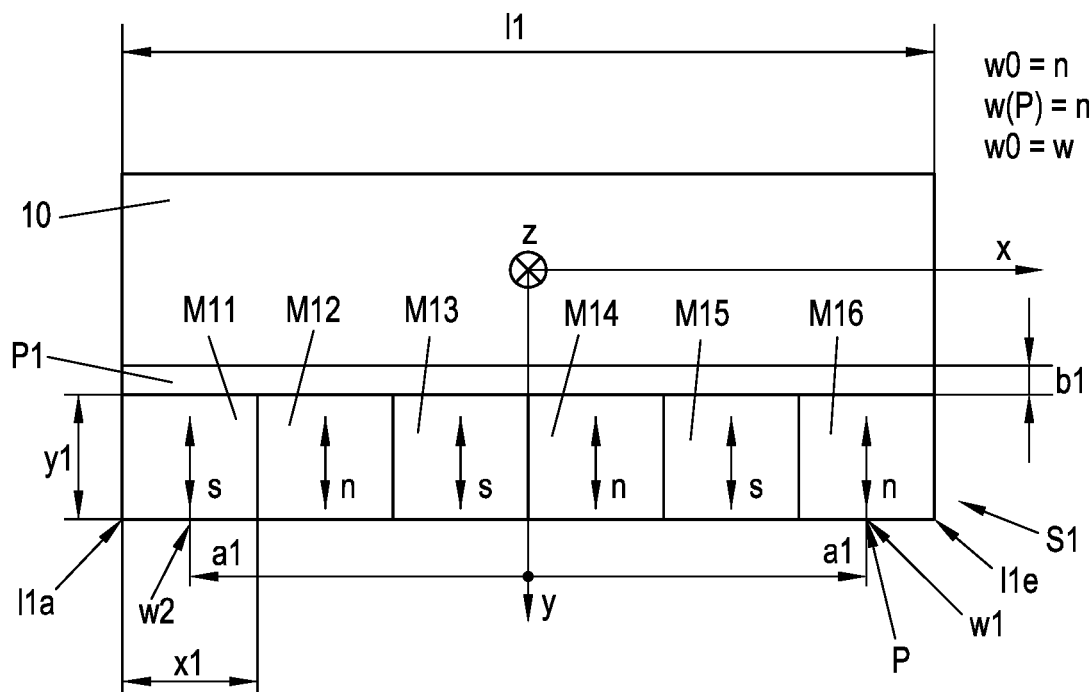
FIG. 3a shows a transport unit having a magnet plate in standard orientation.

FIG. 3a, b is a view of the k=6 magnets M11, . . . , M1k of a transport unit 1 having a central main body 10 in the xy plane. For the sake of clarity, the first guide groups FG1 have not been shown. On the main body 10, in the center of which is the origin of the Cartesian coordinate system, a magnet plate P1 is attached in a positive transverse direction y to a first magnet side S1. The first magnet plate P1 extends in this case over the first magnet side and has the first longitudinal extent I1 and a first plate thickness b1 and is equipped on the side facing away from the main body 2 with the k=6 magnets M11, . . . , M1k. The k=6 magnets M11, . . . , M1k have identical dimensions, that is to say magnet length x1 and magnet width y1 (for clarity, shown in FIG. 3a only for the first magnet M11) and magnet height z1 (not shown, since it is normal to the xy plane). The pole sequence of the k=6 magnets M11, . . . , M1k on the side facing away from the first magnet plate P1 is s-n-s-n-s-n. Viewed from the origin, the first end I1e is in the positive longitudinal direction x as standard, and the first start I1a is in the negative longitudinal direction –x.

Figure 3B:
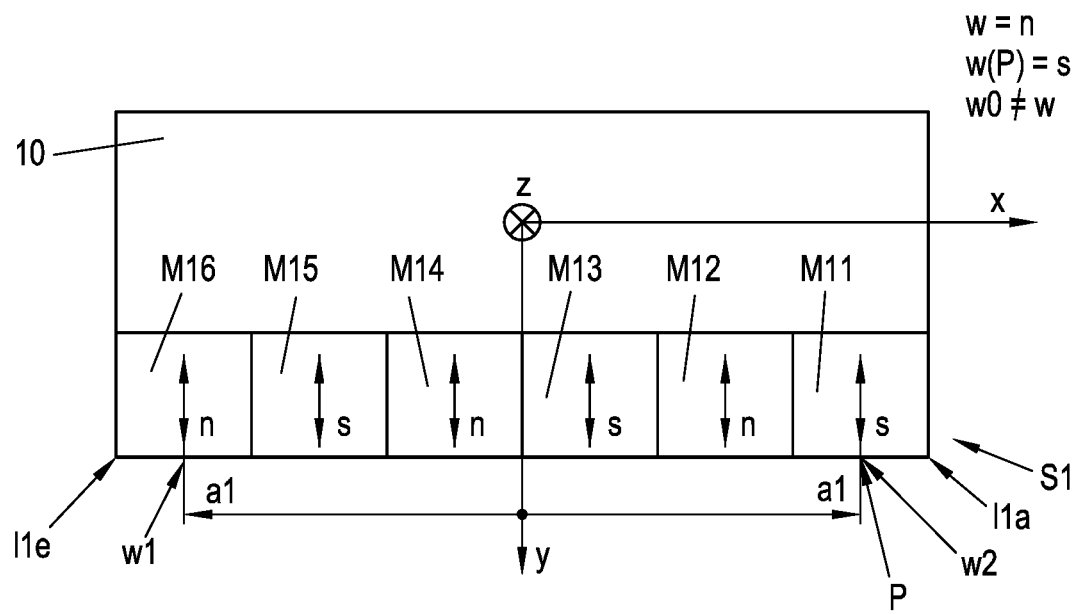
FIG. 3b shows the transport unit having a magnet plate rotated in a transverse direction.

Since the k=6 magnets M11, . . . , M1k are arranged next to one another on the first magnet plate P1 in the longitudinal direction x, transport units 1 having only one magnet plate P1 can also be rotated 180 degrees about the transverse direction y. After a rotation about the transverse direction y, the first end I1e is in the positive longitudinal direction x, and the first start 11a is positioned in the negative longitudinal direction –x, as shown in FIG. 3b. This means that the sequence of the k=6 magnets M11, . . . , M1k is rotated and the pole sequence on the side facing away from the first magnet plate P1 is therefore now n-s-n-s-n-s.

A rotation about the transverse direction y can take place, for example, when the transport unit 1 is attached to the LLM stator. However, during the operation of the long stator linear motor having such a transport unit 1, the transport unit 1 can be rotated about the transverse direction y owing the design of the transport path of the long stator linear motor, in particular in the case of different path portions which are interconnected by switches.

According to the invention, the k=6 magnets M11, . . . , M1k are polarized such that at least one magnet M11, . . . , M1k has a different polarity n, s at a first test distance a1 starting from the center of the first longitudinal extent I1 in the direction of the first end I1e than a magnet at the first test distance a1 starting from the center of the first longitudinal extent I1 in the direction of the first start I1a, which applies to any test distance a1 in the embodiment according to FIG. 2 or FIG. 3a, b.

The method according to the invention can thus be used to easily infer an orientation of the transport unit 1 by determining an actual value w0 of a magnetic test variable at a test point P on a magnet side S1 and comparing it with a reference value.

In the embodiment shown, the test variable P corresponds to the polarity n, s of the magnet M11, . . . , M1k at the test point P, the test point P being the first test distance a1 starting from the center of the longitudinal extent I1 of the first magnet plate P1 (the center is intersected in this case by the transverse direction y which is assumed to be central) in the positive longitudinal direction x or in the negative longitudinal direction –x (depending on whether the transport unit 1 is rotated or in standard orientation). The definition of the standard orientation is, of course, arbitrary and can therefore also be reversed.

It should be assumed that the transport unit 1 in FIG. 3a is in the standard orientation (that is to say, start I1a "at the front" and end I1e "at the rear"). The sixth magnet M16 has a first value w1 in the form of a polarity of w1=n at a first test distance a1 from the transverse direction y in the direction of the first start I1a (in this case in the positive longitudinal direction x). The first magnet M11 has a second value w2 in the form of a polarity of s in the direction of the first end I1e (in this case in the negative longitudinal direction x): w2=s.

The polarity n of the sixth magnet M16 is defined as the reference value w0: w0=n. The test point P is at the first test distance a1 in the positive longitudinal direction x, in the direction of the first start I1a, since it is in the standard orientation. If the actual value w is now determined at the test point P, that is to say the polarity of the sixth magnet M16, this test results in a polarity of w=n for the actual value w. Since the actual value w=n matches the reference value w0=n (w=w0), a standard orientation can be assumed, that is to say that the first start I1a is actually in the positive longitudinal direction x, that is to say "at the front," and the first end I1e is in the negative longitudinal direction –x, that is to say "at the rear," as shown in FIG. 3a.

If, after a rotation about an axis lying in the transverse direction y, the transport unit 1 is oriented in the opposite orientation, as shown in FIG. 3b, the test point P is at the first test distance a1 in the direction of the first end I1e. The first end I1e is in the positive longitudinal direction x "at the front" and accordingly the first start I1a is in the negative longitudinal direction –x, that is to say, "at the rear." If the actual value w(P) is now determined at the test point P, that is to say in this case the polarity s of the first magnet M11 positioned, this test results in a polarity of s for the actual value w(P): w(P)=s. Since the actual value w(P)=s does not match the reference value w0=n, it is inferred that the transport unit 1 is incorrectly oriented.

In an analogous manner the test point P can, of course, instead or additionally be placed at the first test distance a1 in the negative longitudinal direction x, it being imperative, of course, for the reference value w0 to always be adjusted, in this case to a polarity of s in standard orientation.

If, after a rotation about an axis lying in the transverse direction, the transport unit 1 is oriented in the opposite orientation, a signal can be output and the transport unit can be rotated again by 180°, for example, about an axis lying in the transverse direction, so that it is again oriented in the standard orientation. This rotation can be done manually, for example, if necessary. Of course, the reference value w0 can be adjusted, i.e. the previous standard orientation can be changed to the opposite orientation and vice versa. In this case, of course, all other relevant processes must also be adapted to the new orientation.

The value of the magnetic variable along the first magnet side S1 is advantageously asymmetrical in the longitudinal direction x about the center of the longitudinal extent I1. The magnetic variable, that is to say in this case the polarity n, s, can be checked at any test point P, provided the relevant reference value w0 is known. This asymmetrical polarity n, s can be achieved in a simple manner by using an even first number k of magnets M11, . . . , M1k having polarity n, s alternating in the longitudinal direction, as shown in FIGS. 2, 3a and 3b. This asymmetry can, of course, be provided for any determinable magnetic variable in order to realize the present invention.

Since the structural design of a transport unit 1 having a magnet plate P1 can fundamentally only be symmetrical about the center of the first longitudinal extent I1, in principle only one rotation in the longitudinal direction x can lead to a change in the orientation.

However, if a transport unit 1 also has a second magnet plate P2, the magnet sides S1, S2 are advantageously also symmetrical to a plane spanned by the longitudinal direction x and vertical direction z, in order to bring about symmetry about the center of the longitudinal extent I1 in the longitudinal direction x. Symmetries always refer to the origin, that is to say the center of the transport unit 1.

Figure 4:
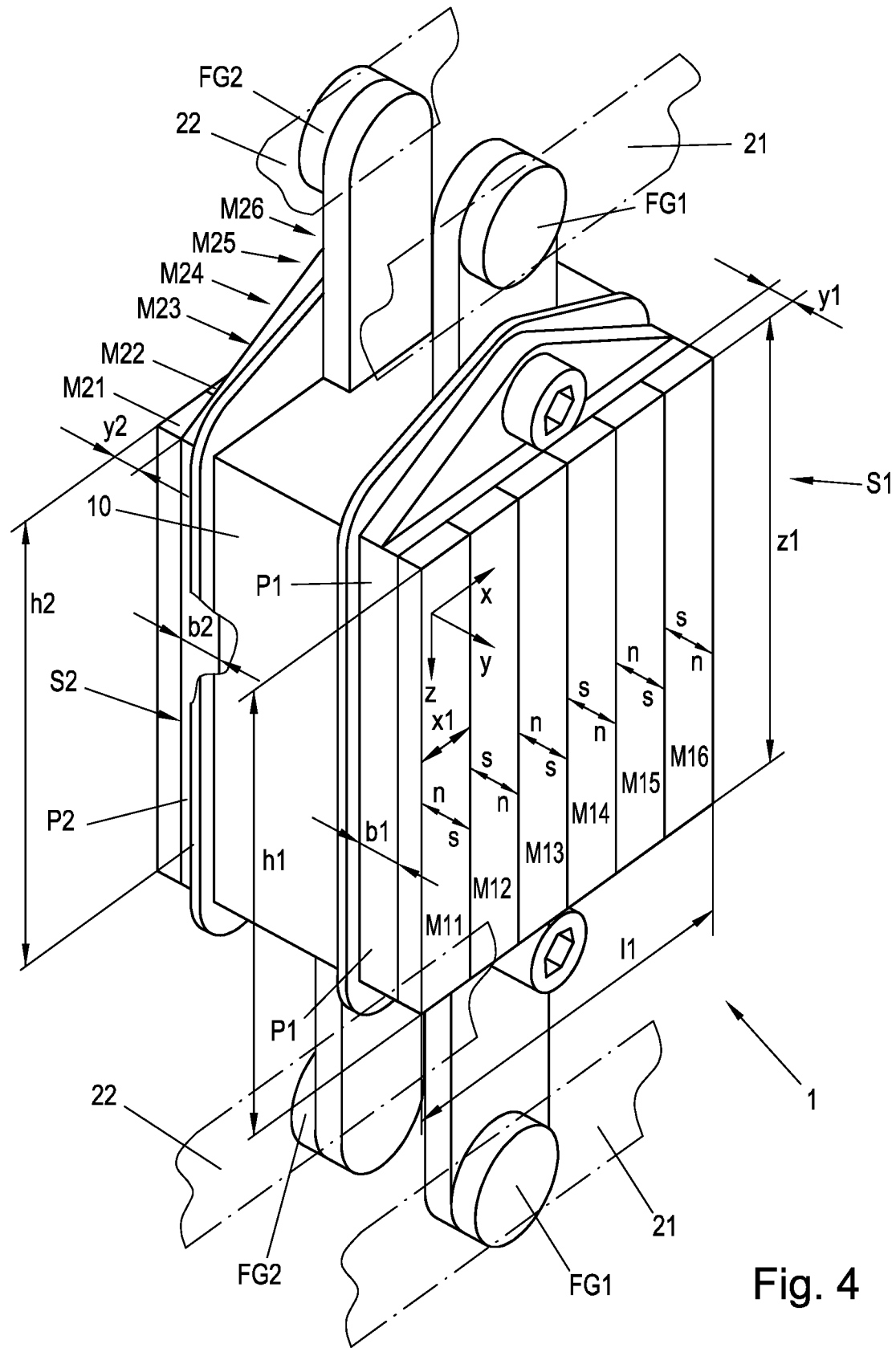
FIG. 4 is a perspective view of a transport unit having two magnet plates.

The embodiment according to FIG. 4 shows a transport unit 1, on the main body 2 of which a second magnet plate P2 is attached in the negative transverse direction −y on a second magnet side S2 by means of a holder 4. The second magnet plate P2 extends over the second magnetic side S2 in the longitudinal direction x from a second start I2a over a second longitudinal extent I2 to a second end I2e and in the vertical direction z over a second height h2. Furthermore, the second magnet plate P2 has a second plate thickness b2 in the transverse direction y. These dimensions of the second magnet side S2, or magnet plate P2, as shown in FIG. 4, are advantageously identical to the first magnet side S1, and/or magnet plate P1, that is to say the second longitudinal extent I2 corresponds to the first longitudinal extent I1, the second height h2 corresponds to the first Height h1 and the second plate thickness b2 corresponds to the first plate thickness b1. On the second magnet side on the second magnet plate P2, a second number I (here 6) of plate-shaped magnets M21, ..., M2I are arranged side by side in the longitudinal direction x, and extend over the second magnet length x2 in the longitudinal direction x and the second magnet height z2 in the vertical direction z and have a second magnet thickness y2 in the transverse direction y. The second number I advantageously corresponds to the first number k. The I magnets M21, ..., M2I also advantageously extend in the vertical direction z to the edge of the second magnet plate P2 (apart from the holder 4), which means that the second magnet height z2 corresponds to the second height h2. The dimensions of the second number I of magnets M21, ..., M2I are advantageously identical to the first number k of magnets M11, ..., M1k of the first magnet plate P1, that is to say the second magnet length x2 corresponds to the first magnet length x1, the second magnet height z2 corresponds to the first magnet height z1, and the second magnet thickness y2 corresponds to the first magnet thickness y1. It also follows that the second magnet length x2, the second magnet height z2 and the second magnet thickness y2 of the individual m magnets M21, ..., M2I are identical for all Imagnets of the second magnet plate P2.

A first guide group FG1 is attached in a positive vertical direction z to a first guide side FS1 and an additional first guide group FG1 is attached in a negative vertical direction −z to a second guide side FS2 on the main body 10. The first guide groups FG1 interact with first path guide groups 21 (outlined with dot-dash lines) and are, by way of example, symmetrical in terms of guidance, that is to say that the transport unit 1 can be guided in the longitudinal direction x both in the standard orientation but also after a 180-degree rotation about an axis lying in the transverse direction. This is achieved here, by way of example, by the fact that the first guide group FG1 attached in the negative vertical direction z is symmetrical to the first guide group FG1 attached in the positive vertical direction z.

Likewise, in the positive vertical direction z, a second guide group FG2 is attached to a second guide side FS2, in this case opposite the first guide side FS1, and in the negative vertical direction −z a further second guide group FG2 is attached to the main body 10. The second guide groups FG2 similarly interact with the second path guide groups 22 (outlined with dot-dash lines) and are, by way of example, likewise symmetrical in terms of guidance. In addition, the first guide group FG1 is, by way of example, equivalent to the second guide side in terms of guidance, that is to say they are interchangeable. This allows the transport unit 1 to rotate by 180 degrees about an axis lying in the longitudinal direction x. After such a rotation, the elements of the first guide group FG1 interact with the elements of the second path guide group 22 and the elements of the second guide group FG2 are in engagement with the elements of the second path guide group 21. In the embodiment shown, the first magnet side S1 advantageously corresponds to the first guide side FS1 and the second magnet side S2 corresponds to the second guide side FS2.

To summarize, the second number m of magnets M21, ... M2I are advantageously symmetrical to the xy plane with respect to the structure and arrangement of the first number k of magnets M11, ... M1k, as shown in FIG. 4, the I magnets M21, ... M2I, as well as the k magnets M11, ... M1k, being in direct contact with one another, but also (for example only partially) being arranged at a distance from one another. However, this symmetry primarily concerns the fundamental arrangement of the first number k of magnets M11, ..., M2k and the second number I M21, ..., M2I of magnets, as well as the first guide group FG1 and second guide group FG2.

The second number m of magnets M21, ..., M2I also each have a polarity of n to s or vice versa in the transverse direction y. This does not have to mean that the second number m of magnets M21, ..., M2I of the second magnet plate P2 in the longitudinal direction x are polarized analogously to the first number k of magnets M11, ..., M1k of the first magnet plate P1. The polarity of the first number k of magnets M11, ..., M1k and the second number I of magnets M21, ..., M2I is not shown in FIG. 4 for reasons of clarity, since this is addressed in more detail in FIGS. 5 and 6.

Owing to this symmetrical structure of a transport unit 1, also depending on the design of elements of the transport path 20, such as the first and second path guide elements 21, 22, drive coils 21, etc. having a first number k of magnets M11, ..., M1k and the second number I of magnets M21, ..., M2I, the transport unit can not only be attached to the LLM stator (owing to the guide symmetry) so as to be rotated by 180° about an axis in the transverse direction y, but (owing to the guide equivalence) can also be rotated by 180° about an axis lying in the longitudinal direction y and by 180° about an axis lying in the vertical direction z.

According to the invention, a transport unit 1 having two magnet sides S1, S2 in this case also has, on the first magnet side S1 at a first test distance a1 starting from the center of the first longitudinal extent I1 in the direction of the first end I1e, a magnetic variable having a first value w1 and has, on the first magnet side S1 at the first test distance a1 starting from the center of the first longitudinal extent I1 in the direction of the first start I1a, a magnetic variable having a second value w2, which differs from the first value w1. In this case, in respect of the polarity n, s of the first number k of magnets M11, ..., M1k as a magnetic variable, this means that the first number k (in this case 6 magnets) M11, ..., M1k is polarized such that at least one magnet M11, ..., M1k at a first test distance a1 starting from the center of the first longitudinal extent I1 in the direction of the first end I1e has a different polarity n, s than a magnet at the first test distance a1 starting from the center of the first longitudinal extent I1 in the direction of the first start I1a, it being particularly advantageous if the polarity n, s of all magnets M11, ..., M1k of the first magnet side S1 is asymmetrical about the center of the first longitudinal extent I1, as shown in FIG. 5a.

Figure 5A:
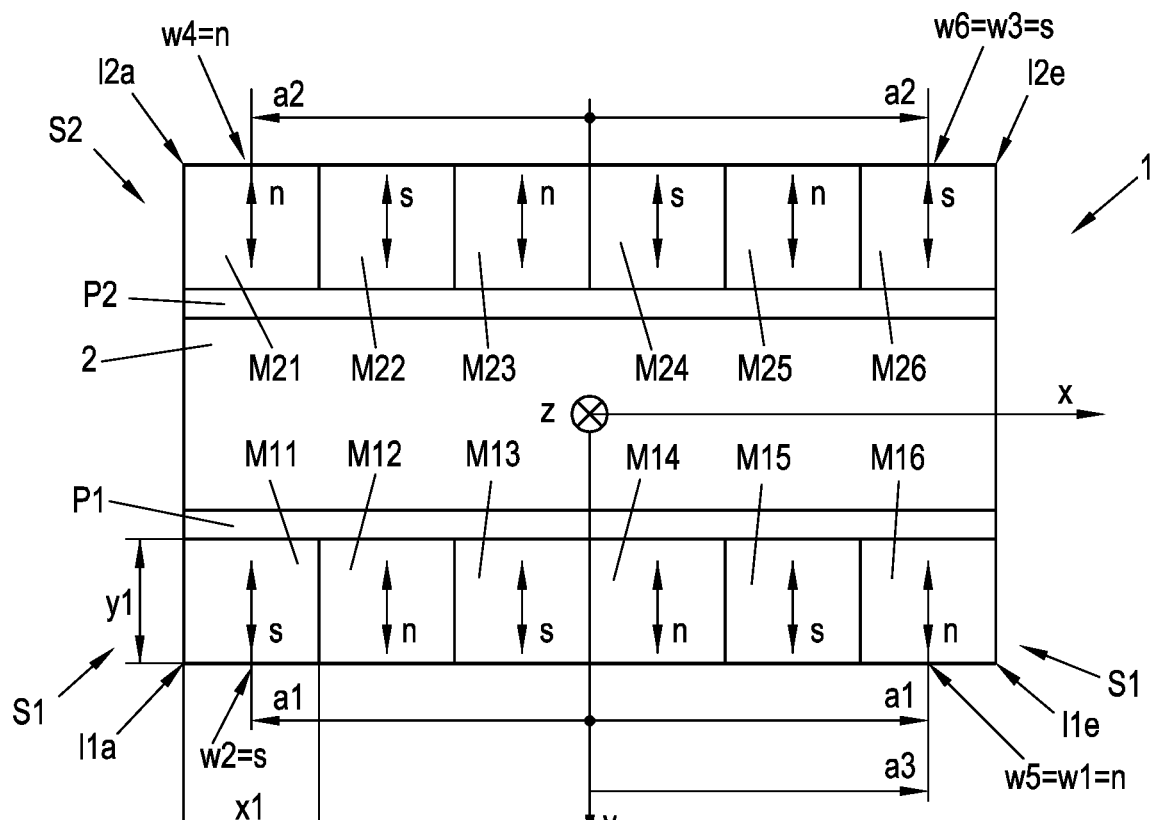
FIG. 5a shows a first embodiment of a transport unit.
Figure 5B:
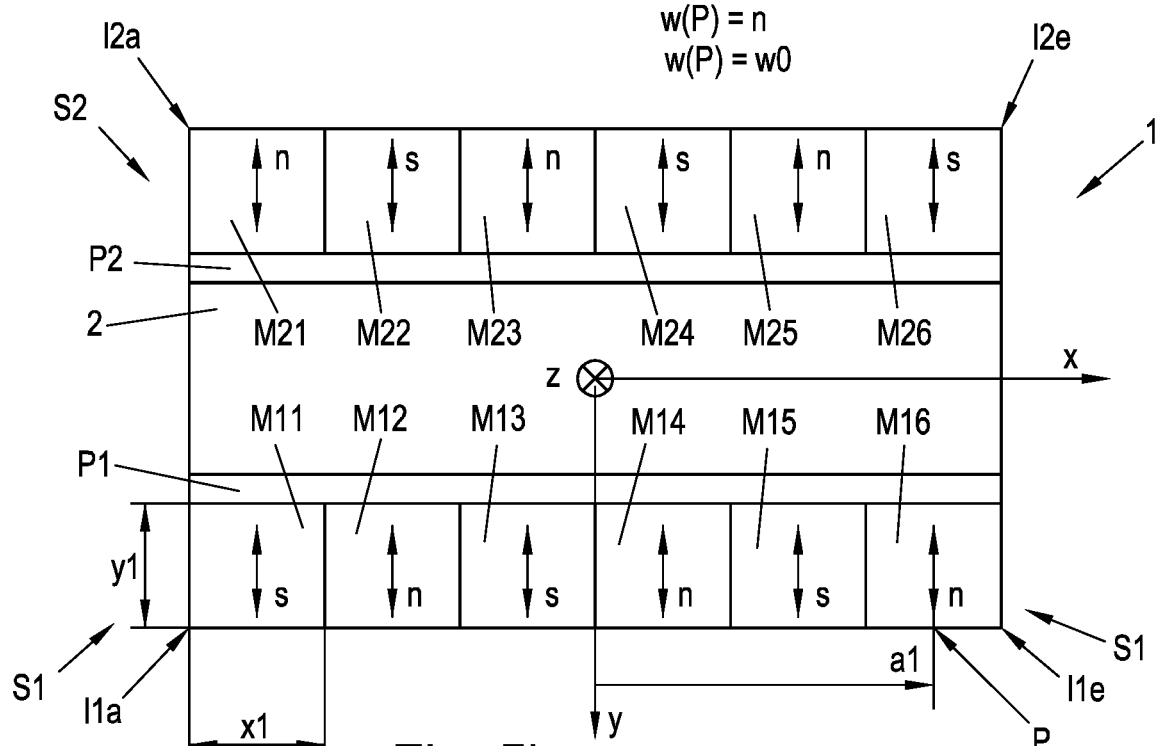
FIG. 5b shows the first embodiment of the transport unit in standard orientation.
Figure 5C:
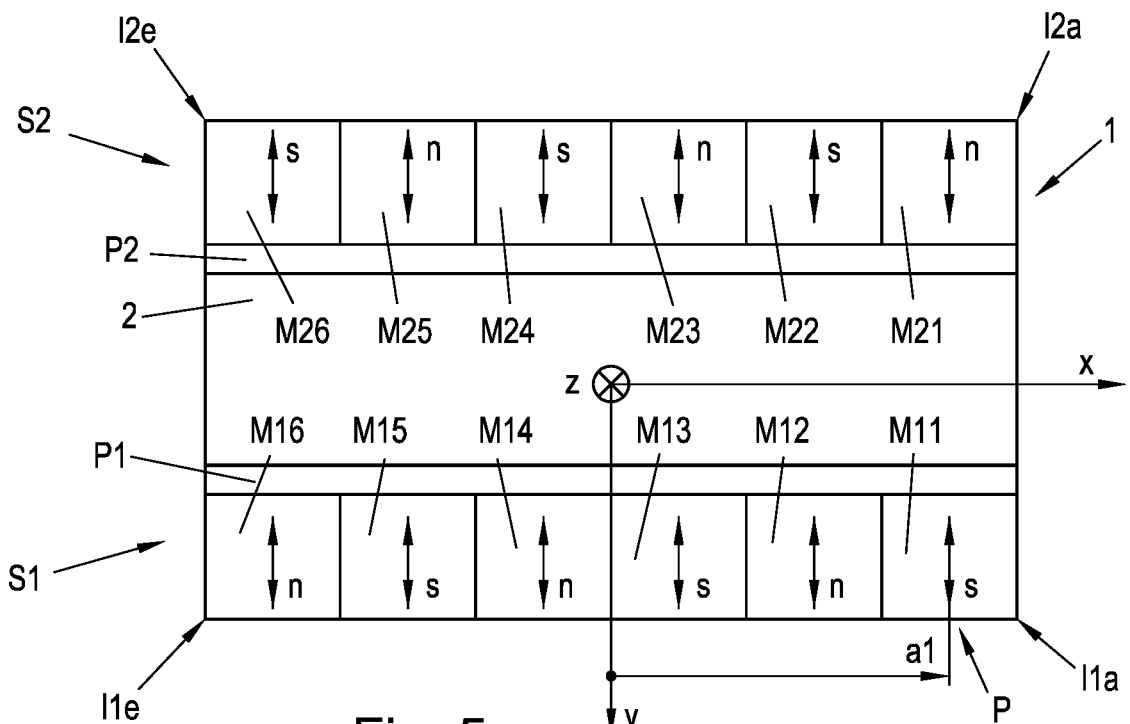
FIG. 5c shows the first embodiment of the transport unit rotated about an axis lying in the transverse direction.

Therefore, for the transport unit 1 of FIG. 5a, similarly to that shown with respect to the transport unit 1 having a magnet plate P1 with reference to FIG. 3b, by checking an actual value w(P) of a test variable at a test point P, thus, for example, a polarity n, s at the first test distance a1 (in the positive transverse direction y, but optionally in the positive longitudinal direction x or in the negative longitudinal direction −x), it can be determined whether the transport unit 1 is in the standard direction or in the opposite direction with respect to the transverse direction y. In FIG. 5b, the actual value w(P)=n corresponds to the reference value w0=n (which corresponds to the first value w1 of the sixth magnet M16; see FIG. 5a), that is to say the transport unit 1 is in the standard orientation. In FIG. 5c, the actual value w(P)=s does not correspond to the reference value w0 (which again corresponds to the first value w1 of the sixth magnet M16; see FIG. 5a), that is to say the transport unit 1 is in the opposite orientation.

Advantageously, the transport unit 1 also has, on the second magnet side S2 at a second test distance a2 starting from the center of the second longitudinal extent I2 in the direction of the second start I2a, a magnetic variable having a fourth value w4, which differs from the third value w3. In this case, in respect of the polarity n, s as a magnetic variable, this means that the first number I (in this case 6) magnets M21, . . . , M2I on the main body 2 on the second magnet side S2 is polarized such that at least one magnet M21, . . . , M1I at a second test distance a2 starting from the center of the second longitudinal extent I2 in the direction of the second end 12e has a different polarity n, s than a magnet M21, . . . , M1I at the second test distance a2 starting from the center of the second longitudinal extent I2 in the direction of the second start I2a, it being particularly advantageous if the polarity n, s of all magnets M21, . . . , M2I of the second magnet side S2 in the longitudinal direction x is asymmetrical about the center of the second longitudinal extent I2 (that is to say asymmetrical to the yz plane), as shown in FIG. 5a.

By checking the actual value w(P) of the test variable at a test point P on the second magnet side S2, that is to say, for example, a polarity n, s of a magnet M21, . . . M1I at the second test distance a2, and comparison with a reference value w0, it can be determined whether the transport unit 1, in the longitudinal direction, is in the standard orientation (FIG. 5b) or in the opposite orientation (FIG. 5c); this is analogous to the first magnet side S1, which is why this is not repeated for the second magnet side S2 in the figures.

In the embodiment according to FIG. 5a, the test distances a1, a2 and the test position a3 are identical. To check the orientation it is, of course, sufficient if the test is carried out using one of the two magnet sides S1, S2.

A rotation about an axis extending in the longitudinal direction x can also be detected. For this purpose, however, it is necessary that the first guide side FS1 is opposite the second guide side FS2 and that the first guide group FG1 is designed to be equivalent to the second guide group FG2 in terms of guidance (that is to say that the first guide group FG1 is interchangeable with the second guide group FG2), that the first magnet side S1 is opposite the second magnet side S2 and the center of the first longitudinal extent I1 and the center of the second longitudinal extent I2 are opposite one another, that the transport unit has, on the first magnet side S1 at a test position a3 in the longitudinal direction x, a magnetic variable having a fifth value w5, and that the transport unit 1 has, on the second magnet side S2 at the test position a3 in the longitudinal direction x, a magnetic variable having a sixth value w6 that differs from the fifth value w5. All of these requirements are given in FIG. 5a in conjunction with FIG. 3, since the polarity n, s acts as a magnetic variable.

The polarity of the sixth magnet M16 of the first magnet side S1 at the test position a3 is in the non-rotated standard orientation (FIG. 5a) n, that is to say that the fifth value w5 is equal to w5=n. The polarity of the sixth magnet M26 of the second magnet side S2 is at the test position a3 and, according to the invention, has a sixth value w6=s, which differs from the fifth value w5=n. The fifth value w5 of the sixth magnet M16 of the first magnet side S1 is assumed as the reference value w0 of the test variable and the actual magnetic value w(P) at the test point P is determined on the supposed first magnet side S1. If the transport unit 1 is in the standard orientation, the actual value w at the test point P (for example corresponding to the test position a3 on the (supposedly and actually) first magnet side S1) corresponds to the reference value w0.

Figure 5D:
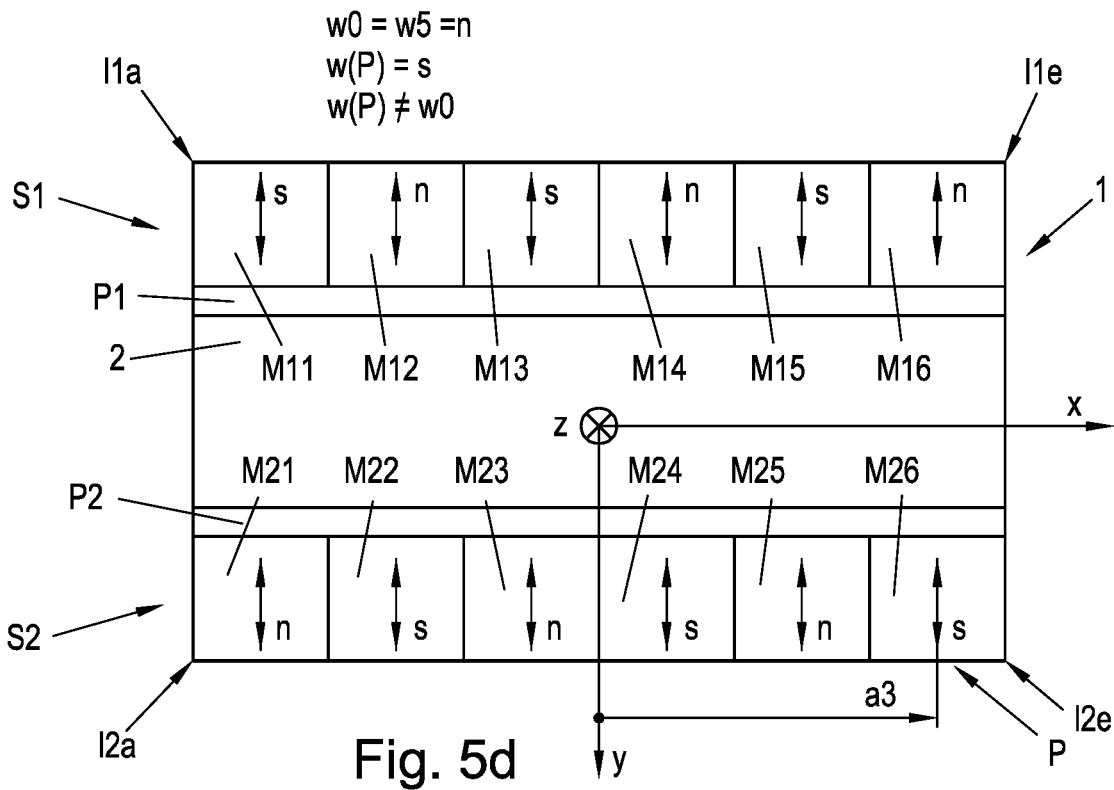
FIG. 5d shows the first embodiment of the transport unit rotated about an axis lying in the longitudinal direction.

However, if the transport unit 1 from FIG. 5a is rotated by 180 degrees about an axis extending in the longitudinal direction x, the first magnet side S1 together with the first number k of magnets M11, . . . , M1k switches places with the second magnet side S2 together with the second number I of magnets M21, . . . , M2I, as can be seen in FIG. 5d. The sixth magnet M26 of the second magnet side S2 and the sixth magnet M16 of the first magnet side S1 thus switch positions. The actual magnetic value w(P) at the test point P is determined on the supposedly first magnet side S1 (but actually on the second magnet side S2). The actual value w(P)=s at the test point P (in this case corresponding to the test position a3 on the first magnet side S1) thus differs from the reference value w0=w5=n. It is thus determined that the transport unit 1 is incorrectly oriented with respect to a rotation about an axis extending in the longitudinal direction x.

Advantageously, the first test distance a1, the second test distance a2 and the point a3 are identical, as is the case in FIG. 5a, whereby an incorrect orientation about an axis lying in the transverse direction y and about an axis lying in the longitudinal direction x can be detected by means of a test point P. In the embodiment according to FIG. 5a, however, detection of a rotation about an axis lying in the vertical direction z is not possible.

In order to be able to determine a rotation of the transport unit 1 about an axis lying in the vertical direction z, the transport unit has, on the first magnet side S1 at a first test distance a1 starting from the center of the first longitudinal extent I1 in the direction of the first end I1e, a magnetic variable having a first value w1, and has, on the first magnet side S1 at the first test distance a1 starting from the center of the first longitudinal extent I1 in the direction of the first start I1a, a magnetic variable having a second value w2, which differs from the first value w1, the transport unit 1 having, on the second magnet side S2 at a second test distance a2 starting from the center of the second longitudinal extent I2 in the direction of the second end I2e, a magnetic variable having a third value w3, and the transport unit 1 having, on the second magnet side S2 at the second test distance a2 starting from the center of the second longitudinal extent I2 in the direction of the second start I2a, a magnetic variable having a fourth value w4 that corresponds to the third value w3, the first and second values w1, w2 differing from the third and fourth values w3, w4. Such a transport unit 1 is shown in FIG. 6a and is structurally identical to the embodiment in FIG. 5a, except for the number of magnets M11, . . . , M1k, M21, . . . , M2I; the polarity of the magnets M11, . . . , M1k, M21, . . . , M2I differs significantly, however, it not being possible to identify a rotation about an axis lying in the transverse direction y.

Advantageously, the values of the magnetic variables, that is to say in this case the polarity of the magnets M11, . . . , M1k, M21, ..., M2I in the longitudinal direction x on the first magnet side S1 can have a different value than on the second magnet side S2, the magnetic variables also being arranged symmetrically about the center of the longitudinal extent I1 and I2 on each magnet side S1, S2. A particularly simple solution is a transport unit 1 having an odd number k, I of magnets M11, ..., M1k, M21, ..., M2I per magnet plate P1, P2, which have alternating polarity n, s, as also shown in FIG. 6a. Here, the fifth magnet M15 of the first magnet side S1 has, at the first test distance a1 in the direction of the first end I1e, the first value w1 in the form of the polarity s. The first magnet M11 of the first magnet side S1 of the first magnet side S1 has, at the first test distance a1 in the direction of the first start I1a, the second value w2 in the form of the polarity s, which matches the first value w1. The fifth magnet M25 of the second magnet side S2 has, at the second test distance a2 in the direction of the second end 12e, the third value w3 in the form of the polarity n. The first magnet M21 of the second magnet side S2 of the second magnet side S2 has, at the test distance a2 in the direction of the second start I2a, the fourth value w4 in the form of the polarity n, which matches the third value w3. The first test distance a1 advantageously corresponds to the second test distance a2, which means that the first and second values differ from the third and fourth values, respectively: w1=w2≠w3=w4.

FIG. 6b shows the transport unit 1 in the standard orientation. The first start I1a of the first magnet side S1 and also the second start I2a of the second magnet side S2 are in the positive longitudinal direction x and accordingly the first end I1e of the first magnet side S1 and also the second end I2e of the second magnet side S2 are in the negative longitudinal direction −x. The first magnet side S1 is also in the positive transverse direction y and the second magnet side S2 is in the negative transverse direction −y. Therefore, the first start I1a is in the positive longitudinal direction x and positive transverse direction y, the first end I1e is in the negative longitudinal direction −x and the positive transverse direction y, the second start I2a is in the positive longitudinal direction x and negative transverse direction −y, and the second end I2e is in the negative longitudinal direction −x and negative transverse direction −y. The polarity n of the fifth magnet M15 of the first magnet side S1 is defined as the reference value w0, which has the first value w1: w0=w1=s.

FIG. 6b shows the transport unit according to FIG. 6a, the orientation being determined. The transport unit is in standard orientation as in FIG. 6a. The test point P is at the first test distance a1 in the positive longitudinal direction x in the direction of the first start I1a. If the actual value w(P) is now determined at the test point P, that is to say the polarity of the fifth magnet M15 corresponding to the first value w1, this test results in a polarity of w(P)=s for the actual value w. Since the actual value w(P)=s matches the reference value w0=w1=s (w(P)=w0), a standard orientation can be assumed.

In this embodiment, not only a rotation about the vertical direction z can be detected, but also a rotation about the longitudinal direction x. In FIG. 6c, rotation about the longitudinal direction x takes place, which can be detected in the same way as described with reference to FIG. 5c.

FIG. 6d shows the transport unit from FIG. 6a, which was rotated about the vertical direction z. The first start I1a is now in the negative longitudinal direction −x and negative transverse direction −y, the first end I1e is in the positive longitudinal direction x and negative transverse direction −y, the second start I2a is in the negative longitudinal direction −x and positive transverse direction y, and the second end I2e is in the positive longitudinal direction x and positive transverse direction y. The fifth magnet M15 of the first magnet side S1 now has the polarity s at the test distance a1 along the positive longitudinal direction, the fifth magnet M25 of the second magnet side S2 has the polarity n.

The test point P is thus at the first test distance a1 in the direction of the first end I1e. The first end I1e is in the positive longitudinal direction x "at the front" and accordingly the first start I1a is in the negative longitudinal direction −x, that is to say, "at the rear." If the actual value w (P) is now determined at the test point P, that is to say in this case the polarity s of the first magnet M21 of the second magnet side S2, this test results in a polarity of n: w=n for the actual value w(P). Since the actual value w=n does not match the reference value w0=s, it is inferred that the transport unit 1 is incorrectly oriented.

Thus, by determining the actual value of a magnetic test variable on a magnet side S1, S2 at a test point P and comparing it with a reference value w0, an incorrect orientation about the vertical direction z can be determined.

It should be noted, however, that in this embodiment, owing to the symmetry of the magnetic variables about the center of the longitudinal extents I1, I2, rotation about an axis extending in the transverse direction y cannot be determined. In addition, in this embodiment, rotation along an axis lying in the longitudinal direction x and also an axis lying in the vertical direction z cannot be determined and would be incorrectly assumed to be the standard orientation.

The invention claimed is:

1. A transport unit for a long stator linear motor, the transport unit comprising:
   a first guide side, which is positioned laterally with respect to a longitudinal direction and on which a first guide group is arranged,
   a second guide side, which is positioned laterally with respect to the longitudinal direction and on which a second guide group is arranged, the second guide group being opposite the first guide side and the second guide group being configured so as to be equivalent to the first guide group in terms of guidance,
   a first magnet side, which is positioned laterally with respect to the longitudinal direction and faces outwards, and which extends in the longitudinal direction a first longitudinal extent from a first start to a first end,
   a second magnet side, which is positioned laterally with respect to the longitudinal direction and faces outwards, and which extends in the longitudinal direction over a second longitudinal extent from a second start to a second end, the first magnet side being opposite the second magnet side and the center of the first longitudinal extent and the center of the second longitudinal extent being opposite one another,
   wherein the transport unit has:
      on the first magnet side at a first test distance starting from the center of the first longitudinal extent in the direction of the first end, a magnetic variable having a first value, and has, on the first magnet side at the first test distance starting from the center of the first longitudinal extent in the direction of the first start, a magnetic variable having a second value which corresponds to the first value;
      on the second magnet side at a second test distance starting from the center of the second longitudinal extent in the direction of the second end, a magnetic variable having a third value; and on the second magnet side at the second test distance starting from the center of the second longitudinal extent in the direction of the second start, a magnetic variable having a fourth value that corresponds to the third value, the first and second values differing from the third and fourth values.

2. The transport unit according to claim 1, wherein the first test distance corresponds to the second test distance.

3. The transport unit according to claim 2, wherein all values of the magnetic variables in the longitudinal direction on the first magnet side have a different value than on the second magnet side.

4. The transport unit according to claim 1, wherein the values of the magnetic variables on the first magnet side are symmetrical about the center of the first longitudinal extent, and in that the values of the magnetic variables on the second magnet side are symmetrical about the center of the second longitudinal extent.

5. The transport unit according to claim 1, wherein the values of the magnetic variables on the first magnet side are asymmetrical about the center of the first longitudinal extent.

6. The transport unit according to claim 1, wherein the magnetic variable is specified by a magnetic resistance.

7. The transport unit according to claim 6, wherein the magnetic resistance comprises at least one of a first magnet plate attached to the first magnet side or a second magnet plate attached to the second magnet side.

8. The transport unit according to claim 1, wherein on the first magnet side a first number k of magnets, and/or on the second magnet side a second number 1 of magnets, are arranged, which are each provided with a polarity in the transverse direction, the magnetic variable being specified by the polarity of the first number k of magnets and/or the second number 1 of magnets.

9. A long stator linear motor having at least one transport unit according to claim 1, and having a transport path having a first path guide group and/or a second path guide group which interact with the first guide group and/or the second guide group in order to guide the at least one transport unit along the transport path in a movement direction.

10. A method for determining the orientation of a transport unit according to claim 1, wherein, on a magnet side which is positioned laterally with respect to the longitudinal direction, an actual value of a magnetic test variable is determined at a test point and compared with a reference value; and in that if the actual value does not match the reference value, incorrect orientation of the transport unit is inferred.

11. The method according to claim 10, wherein a polarity of a magnet of the transport unit is determined as the magnetic test variable.

12. A transport unit for a long stator linear motor, the transport unit comprising:
a first guide side which is positioned laterally with respect to a longitudinal direction and on which a first guide group, which is symmetrical in terms of guidance, is arranged and
a first magnet side which is positioned laterally with respect to the longitudinal direction and which extends in the longitudinal direction over a first longitudinal extent from a first start to a first end,
wherein the transport unit has:
on the first magnet side at a first test distance starting from the center of the first longitudinal extent in the direction of the first end, a magnetic variable having a first value; and
on the first magnet side at the first test distance starting from the center of the first longitudinal extent in the direction of the first start, a magnetic variable having a second value, which differs from the first value,
wherein the transport unit is rotatable about an axis normal to a plane of the first magnet side from a first orientation to a second orientation, and
wherein an orientation of the transport unit is determinable from a location of the magnetic variable having the first value.

13. The transport unit according to claim 12, wherein
the transport unit has a second guide side, which is positioned laterally with respect to the longitudinal direction and on which a second guide group is arranged and
the transport unit has a second magnet side, which is positioned laterally with respect to the longitudinal direction and which extends in the longitudinal direction over a second longitudinal extent from a second start to a second end; wherein
the second guide group is symmetrical in terms of guidance; wherein
the transport unit has, on the second magnet side at a second test distance starting from the center of the second longitudinal extent in the direction of the second end, a magnetic variable having a third value; and wherein
the transport unit has, on the second magnet side at the second test distance starting from the center of the second longitudinal extent in the direction of the second start, a magnetic variable having a fourth value, which differs from the third value.

14. The transport unit according to claim 13, wherein the first guide side is opposite the second guide side; wherein the first magnet side is opposite the second magnet side and the center of the first longitudinal extent and the center of the second longitudinal extent are opposite one another; wherein the transport unit has, on the first magnet side at a test position in the longitudinal direction, a magnetic variable having a fifth value; and wherein the transport unit has, on the second magnet side at the test position in the longitudinal direction, a magnetic variable having a sixth value that differs from the fifth value.

15. The transport unit according to claim 14, wherein the first test distance corresponds to the second test distance and the test position.

16. The transport unit according to claim 14, wherein, in the longitudinal direction, all the values of the magnetic variables on the first magnet side differ from the values of the magnetic variables on the second side.

* * * * *